United States Patent
Iida et al.

(10) Patent No.: US 10,921,514 B2
(45) Date of Patent: Feb. 16, 2021

(54) SEMICONDUCTOR DEVICE AND MANUFACTURING METHOD OF THE SAME

(71) Applicant: RENESAS ELECTRONICS CORPORATION, Tokyo (JP)

(72) Inventors: Tetsuya Iida, Ibaraki (JP); Yasutaka Nakashiba, Ibaraki (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 16/438,067

(22) Filed: Jun. 11, 2019

(65) Prior Publication Data
US 2019/0391325 A1    Dec. 26, 2019

(30) Foreign Application Priority Data
Jun. 22, 2018 (JP) .............................. JP2018-118990

(51) Int. Cl.
| | |
|---|---|
| *G02B 6/036* | (2006.01) |
| *G02B 6/42* | (2006.01) |
| *G02B 6/30* | (2006.01) |
| *G02B 6/32* | (2006.01) |
| *G02B 6/125* | (2006.01) |

(52) U.S. Cl.
CPC .......... *G02B 6/03688* (2013.01); *G02B 6/42* (2013.01)

(58) Field of Classification Search
CPC .... G02B 6/03688; G02B 6/42; G02B 6/4214; G02B 6/30; G02B 6/32; G02B 6/125; G02B 6/1228
See application file for complete search history.

(56) References Cited

U.S. PATENT DOCUMENTS

| | | | |
|---|---|---|---|
| 7,257,295 B2* | 8/2007 | Yokouchi | G02B 6/24 385/30 |
| 8,903,210 B2* | 12/2014 | Ellis-Monaghan | G02B 6/4214 385/43 |
| 9,405,066 B2* | 8/2016 | Mahgerefteh | G02B 6/136 |
| 9,442,249 B2* | 9/2016 | Yoshida | G02B 6/125 |
| 10,564,354 B2* | 2/2020 | Fortusini | G02B 6/4214 |
| 10,698,164 B2* | 6/2020 | Psaila | G02B 6/13 |

FOREIGN PATENT DOCUMENTS

| | | |
|---|---|---|
| JP | 2013-178333 A | 9/2013 |
| JP | 2017-151146 A | 8/2017 |

* cited by examiner

*Primary Examiner* — Ryan A Lepisto
(74) *Attorney, Agent, or Firm* — McDermott Will & Emery LLP

(57) ABSTRACT

The semiconductor device includes an optical waveguide WG1 formed in a planar manner, and a three-dimensional optical waveguide WG2 optically connected with the optical waveguide WG1 and including a curved shape.

21 Claims, 20 Drawing Sheets

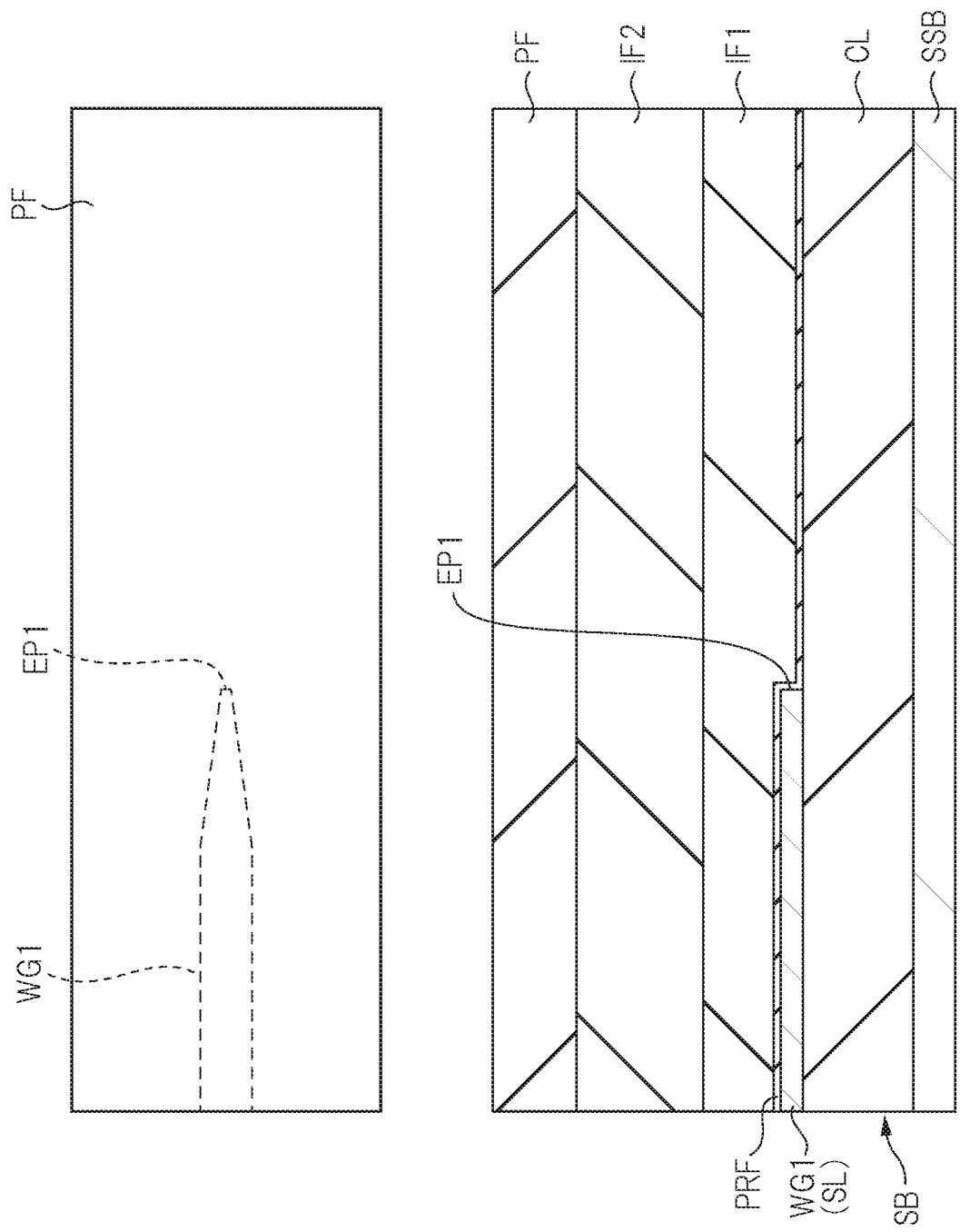

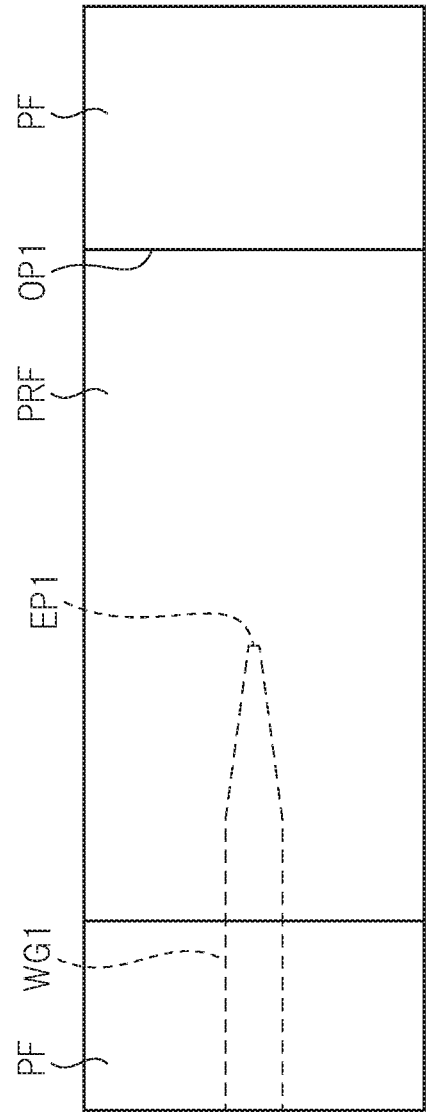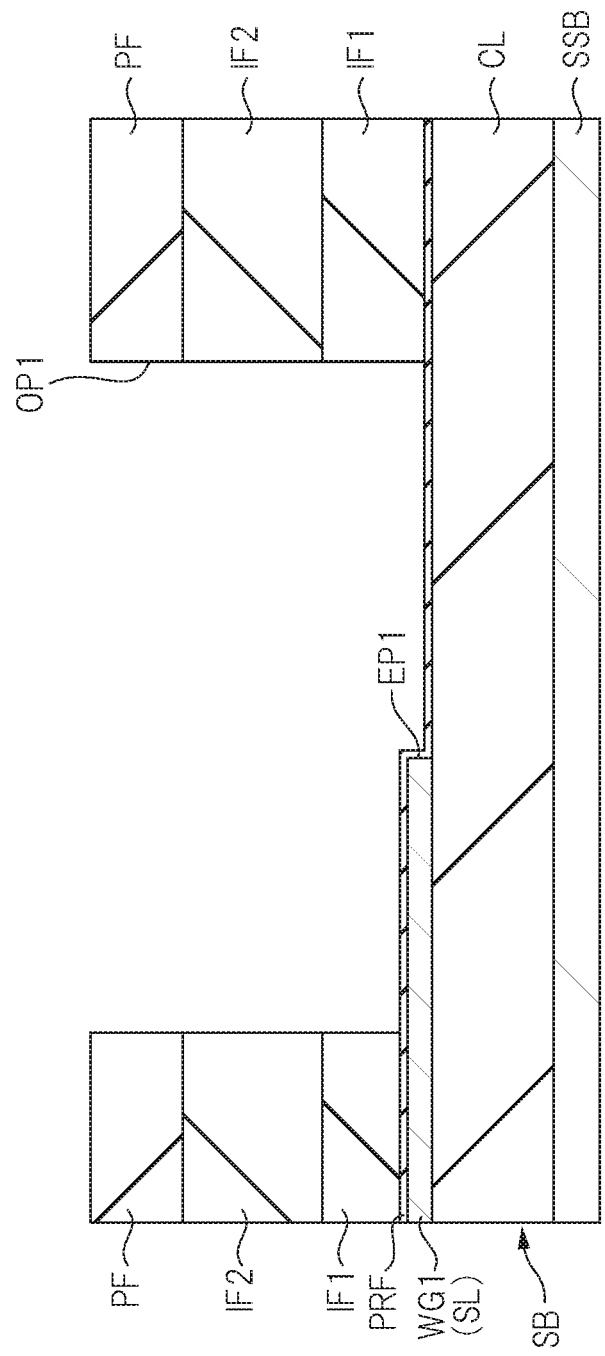
FIG. 12A
FIG. 12B

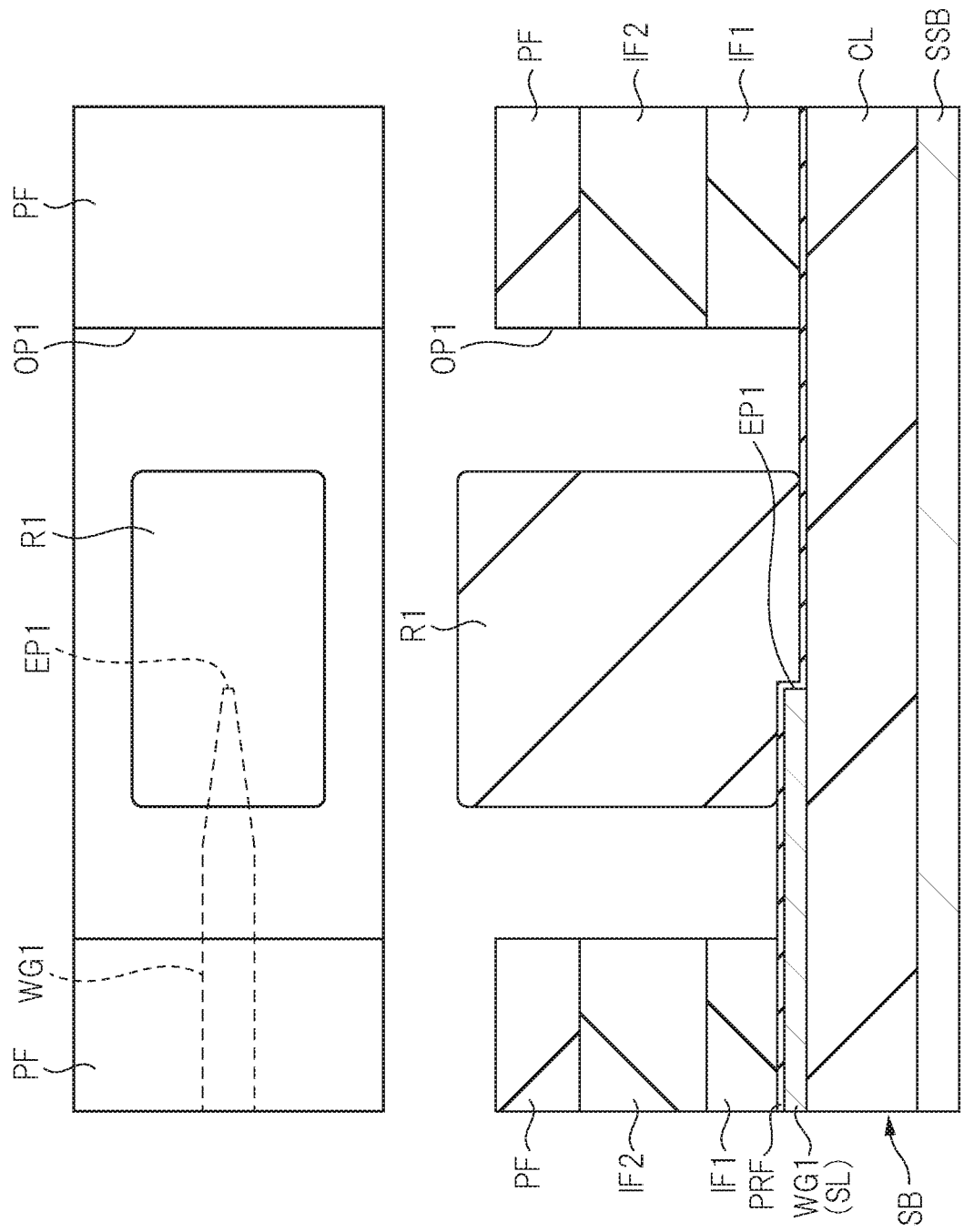

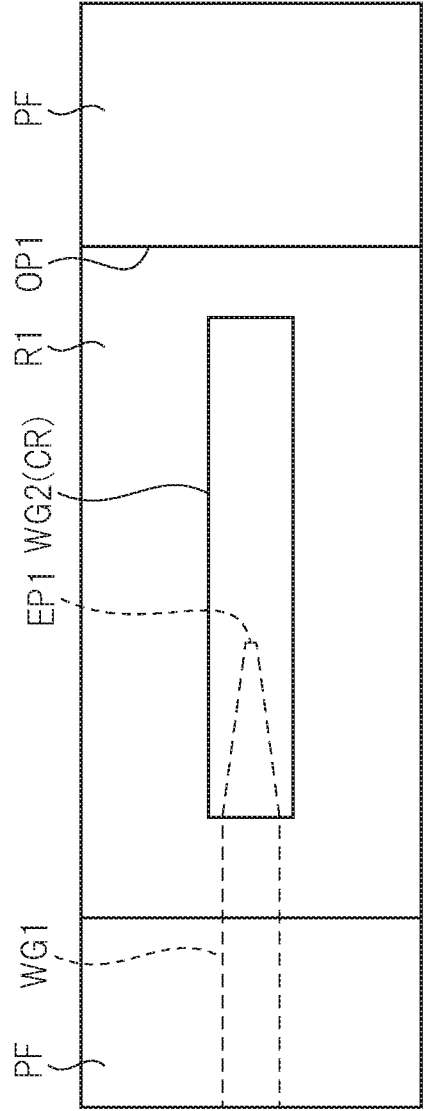
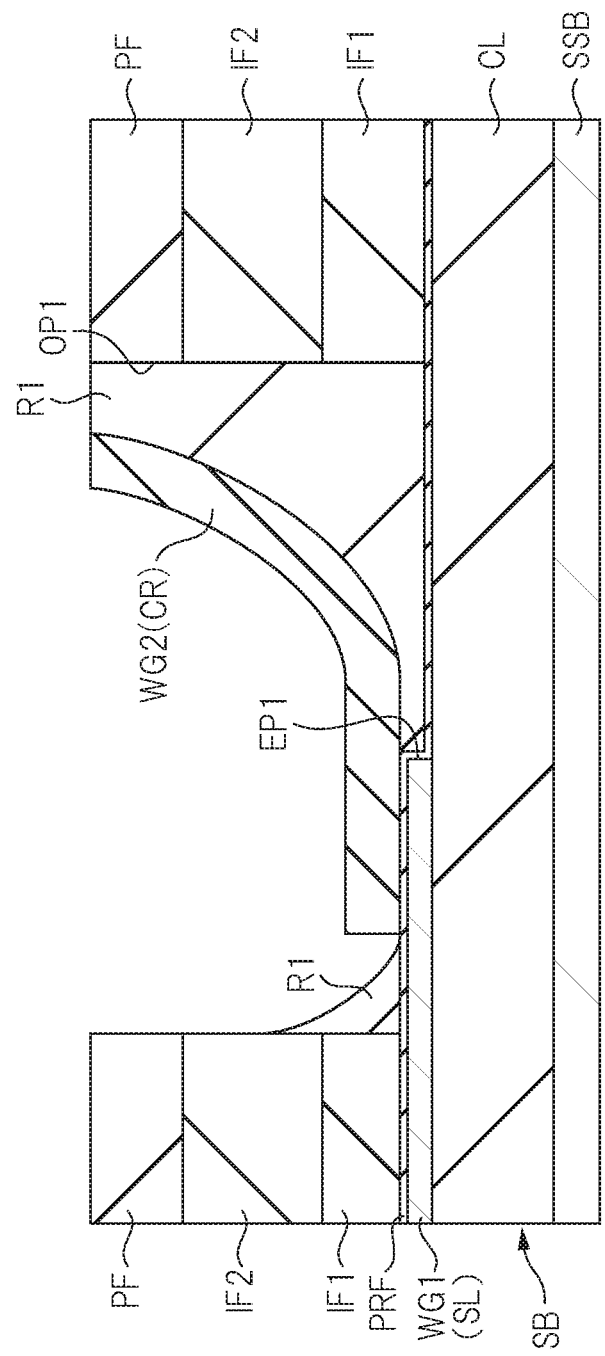
FIG. 17A
FIG. 17B

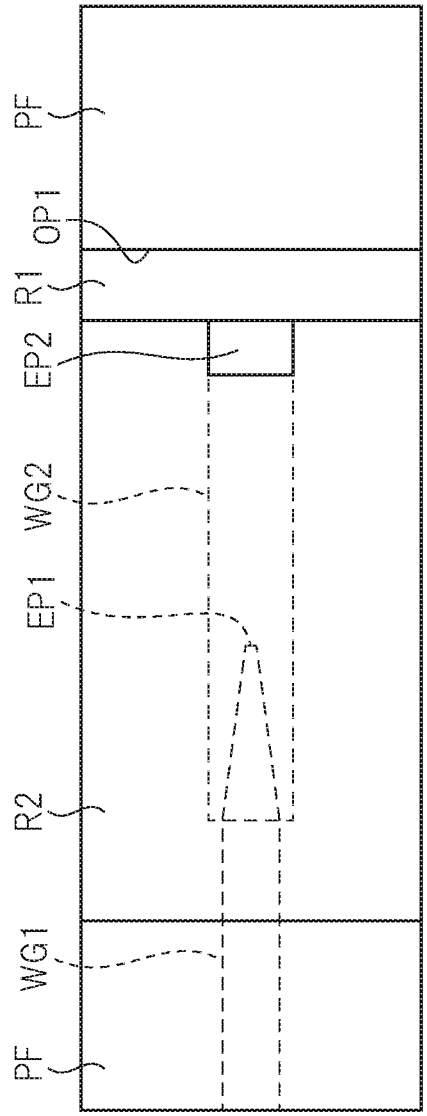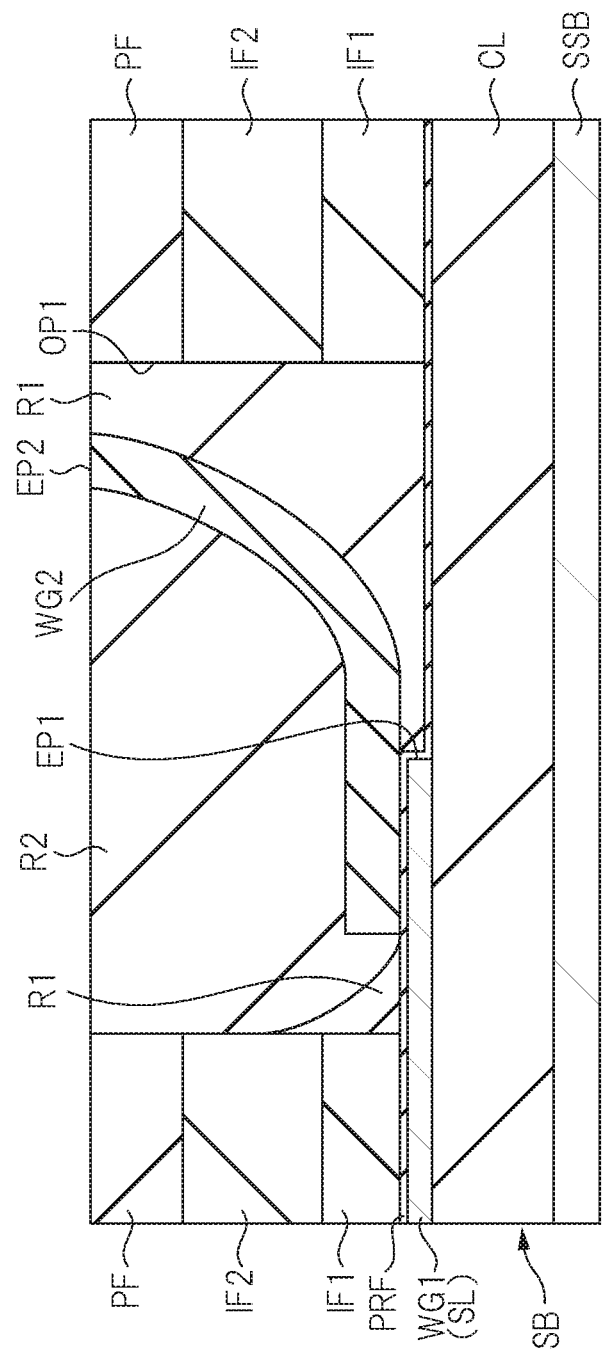
FIG. 18A
FIG. 18B

SEMICONDUCTOR DEVICE AND MANUFACTURING METHOD OF THE SAME

CROSS-REFERENCE TO RELATED APPLICATIONS

The disclosure of Japanese Patent Application No. 2018-118990 filed on Jun. 22, 2018 including the specification, drawings and abstract is incorporated herein by reference in its entirety.

BACKGROUND

The present invention relates to a semiconductor device and a manufacturing method of the same, and, for example, to a semiconductor device including an optical waveguide and a technique effective to be applied to the manufacturing technique thereof.

Japanese Patent Laying-Open No. 2017-151146 describes a technique related to a semiconductor device having a vertical optical waveguide.

Japanese Patent Application Laid-Open No. 2013-178333 describes a technique for forming stereoscopically curved silicon thin wire optical waveguide.

SUMMARY

Optical circuits are often typically constructed in a single plane. However, in recent years, in order to realize miniaturization of a semiconductor device including an optical circuit, it has been desired to improve the degree of integration of the optical circuit and the degree of freedom in mounting the optical circuit. In this regard, for example, it has been investigated to realize miniaturization of a semiconductor device including an optical waveguide by three-dimensionally forming an optical waveguide through which an optical signal propagates. At this time, in a semiconductor device including a three-dimensional optical waveguide, it is desired to improve characteristics by reducing optical loss.

Other objects and novel features will become apparent from the description of this specification and the accompanying drawings.

The semiconductor device according to embodiments includes a first optical waveguide formed in a planar manner, and a stereoscopic second optical waveguide optically connected with the first optical waveguide and having a curved shape.

According to embodiments, characteristics of a semiconductor device can be improved.

BRIEF DESCRIPTION OF THE DRAWINGS

FIG. 11A is a plan view illustrating a manufacturing step of semiconductor device according to the first embodiment, and FIG. 11B is a cross-sectional view illustrating a manufacturing step of semiconductor device according to the first embodiment.

FIG. 12A a cross-sectional view illustrating a manufacturing step of the semiconductor device following FIG. 11A, and FIG. 12B is a cross-sectional view illustrating a manufacturing step of the semiconductor device following FIG. 11B.

FIG. 13A a cross-sectional view illustrating a manufacturing step of the semiconductor device following FIG. 12A, and FIG. 13B is a cross-sectional view illustrating a manufacturing step of the semiconductor device following FIG. 12B.

FIG. 17A is a cross-sectional view illustrating a manufacturing step of the semiconductor device following FIG. 16A, and FIG. 17B is a cross-sectional view illustrating a manufacturing step of the semiconductor device following FIG. 16B.

FIG. 18A cross-sectional view illustrating a manufacturing step of the semiconductor device following FIG. 17A, and FIG. 18B is a cross-sectional view illustrating a manufacturing step of the semiconductor device following FIG. 17B.

DETAILED DESCRIPTION

Figure 1:
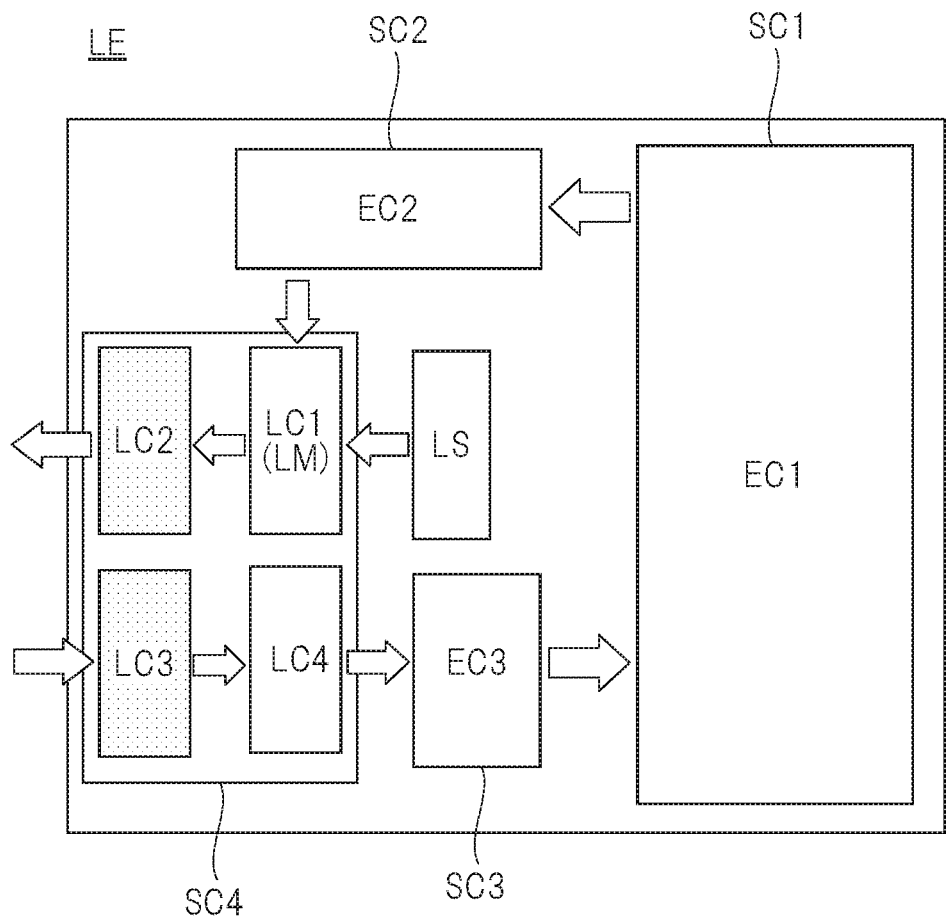
FIG. 1 is a diagram illustrating the schematic configuration of an optical hybrid device according to a first embodiment.

In the following embodiments, when it is necessary for convenience, the description will be made by dividing into a plurality of sections or embodiments, but except for the case specifically specified, these sections and embodiments are not independent of each other, and one of them is related to some or all of modifications, details, supplementary description, and the like of the other.

In addition, when referring to the numbers of elements (including numbers, figures, quantities, ranges, etc.) in the following embodiment, except when explicit or where they are clearly limited to specific numbers in principle, etc., it is not limited to a specific number. A specific number or more may be allowed or less.

Furthermore, in the following embodiments, it is needless to say that the constituent elements (including element steps and the like) are not necessarily essential except in the case where they are specifically specified and the case where they are considered to be obviously essential in principle.

Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

In all the drawings for explaining the embodiments, the same members are denoted by the same reference numerals in principle, and repetitive descriptions thereof are omitted. In order to make the drawings easy to understand, hatching may be used even in a plan view.

First Embodiment

<Configuration of >

First, a configuration example of a photoelectric hybrid device in the first embodiment will be described with reference to the drawings. FIG. 1 is a diagram illustrating a schematic configuration of an optical hybrid apparatus according to the first embodiment. In FIG. 1, the photoelectric hybrid device LE according to the first embodiment includes, for example, four semiconductor chips SC1 to SC4 and a light source LS.

An electronic circuit EC1 is formed on the semiconductor chip SC1. Similarly, an electronic circuit EC2 is formed in the semiconductor chip SC2, and an electronic circuit EC3 is formed in the semiconductor chip SC3. On the other hand, optical circuits LC1 to LC4 are formed in the semiconductor chip SC4.

The light source LS is a laser oscillator that emits laser light of a predetermined wavelength, and is optically connected with an optical circuit LC1 formed in the semiconductor chip SC4 through, for example, an optical fiber or the like. That is, the continuous-wave laser (Continuous Wave Laser) light having predetermined wavelengths emitted from the light source LS enters the optical circuit LC1.

The electronic circuit EC1 of the semiconductor chip SC1 includes, for example, a control circuit and a memory circuit, and is electrically connected with the electronic circuit EC2 of the semiconductor chip SC2. The electronic circuit EC2 is composed of a circuit such as a transceiver IC (Transceiver Integrated Circuit) that can exchange bidirectional signals, and is electrically connected with the optical circuit LC1 of the semiconductor chip SC4.

The optical circuit LC1 is an optical circuit that converts an electric signal into an optical signal, and is configured by, for example, an optical modulator LM. The optical circuit LC1 is configured to modulate the phase of the light incident from the light source LS based on a control signal (electric signal) transmitted from the electronic circuit EC1 through the electronic circuit EC2.

In this case, the light source LS is optically connected with an optical waveguide for input of the optical circuit LC1 (optical modulator LM). As a result, the continuous wave laser light emitted from the light source LS enters the optical waveguide for input of the optical circuit LC1 (optical modulator LM). Here, "optically connected" means that light can be transmitted.

Further, the electronic circuit EC2 is electrically connected with an optical waveguide (a pair of optical waveguides) for optical modulation constituting the optical circuit LC1 (optical modulator LM). Thus, the potential supplied from the electronic circuit EC1 to the optical circuit LC1 via the electronic circuit EC2 is supplied to the optical waveguide for light modulation of the optical circuit LC1.

The output of the optical circuit LC1, i.e., the optical waveguide for the output of the optical modulator LM, is optically connected with the optical circuit LC2 formed in the same semiconductor chip SC4. The optical circuit LC2 according to the first embodiment is composed of, for example, an input/output element (I/O element) composed of an optical waveguide, and differs from a normal optical circuit composed of, for example, a grating coupler. The optical signal transmitted from the optical circuit LC1 is output to the outside of the photoelectric hybrid device LE via the input/output element of the optical circuit LC2 according to the first embodiment.

Like the optical circuit LC2 in the first embodiment, the optical circuit LC3 formed in the semiconductor chip SC4 is also formed of, for example, an input/output element (I/O element) formed of an optical waveguide, and differs from a normal optical circuit formed of, for example, a grating coupler. The optical circuit LC3 is optically connected with an optical circuit LC4 formed on the same semiconductor chip SC 4. An optical signal input from the outside of the photoelectric hybrid device LE is input to the optical circuit LC4 via the optical circuit LC3.

The optical circuit LC4 is a photoelectric conversion photodetector (e.g., a photodiode) that converts the optical signal sent from the optical circuit LC3 into an electrical signal, and is electrically connected with the electronic circuit EC3 formed in the semiconductor chip SC3. The electronic circuit EC3 is configured by a circuit capable of bidirectional signal exchange such as a transceiver IC, for example, and is electrically connected with the electronic circuit EC1 formed on the semiconductor chip SC1.

As described above, the photoelectric hybrid device LE according to the first embodiment is configured.

(Configuration of Optical Modulator)

Next, the configuration of the optical modulator LM included in the optical circuit LC1 of the photoelectric hybrid device LE in the first embodiment will be described with reference to the drawings.

Figure 2:
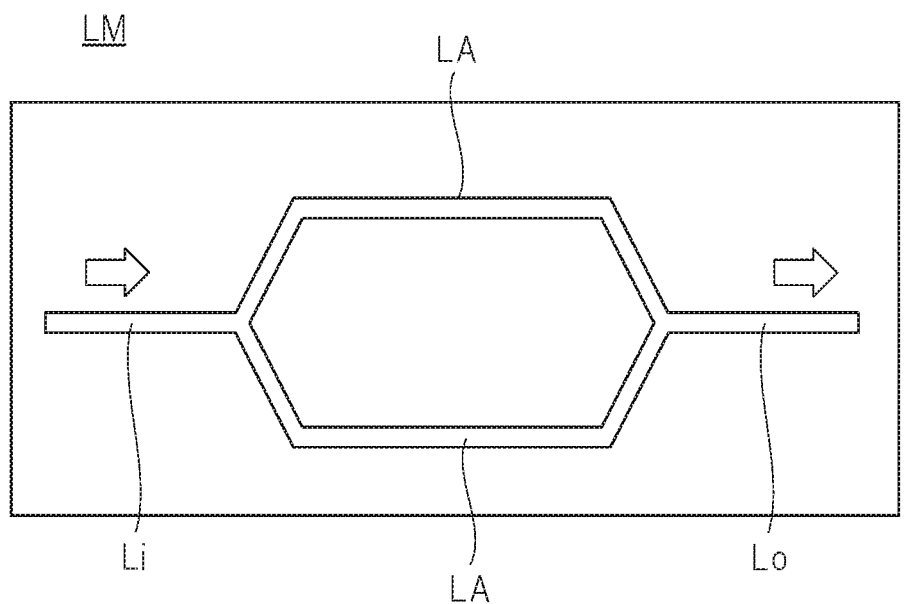
FIG. 2 is a schematic plan view of an optical modulator.

FIG. 2 is a schematic plan view of the optical modulator LM constituting the optical circuit LC1 shown in FIG. 1. The arrows shown in FIG. 2 indicate the propagation directions of light.

In FIG. 2, the optical modulator LM has an input optical waveguide Li, an output optical waveguide Lo, and two optical waveguides LA and LA connected in parallel between the input optical waveguide Li and the output optical waveguide Lo. At this time, the input optical waveguide Li, the two optical waveguides LA and LA, and the output optical waveguide Lo are optically connected.

In the optical modulator LM configured as described above, the light input through the input optical waveguide Li is branched into two optical waveguides LA and LA, and after being given a phase difference by the respective optical waveguides LA and LA, the light is merged by the output optical waveguide Lo. The phase and amplitude of the light can be modulated by the interference of the light generated at the time of convergence in the output optical waveguide Lo.

Next, the device structure of the optical modulator LM will be described with reference to the drawings.

Figure 3:
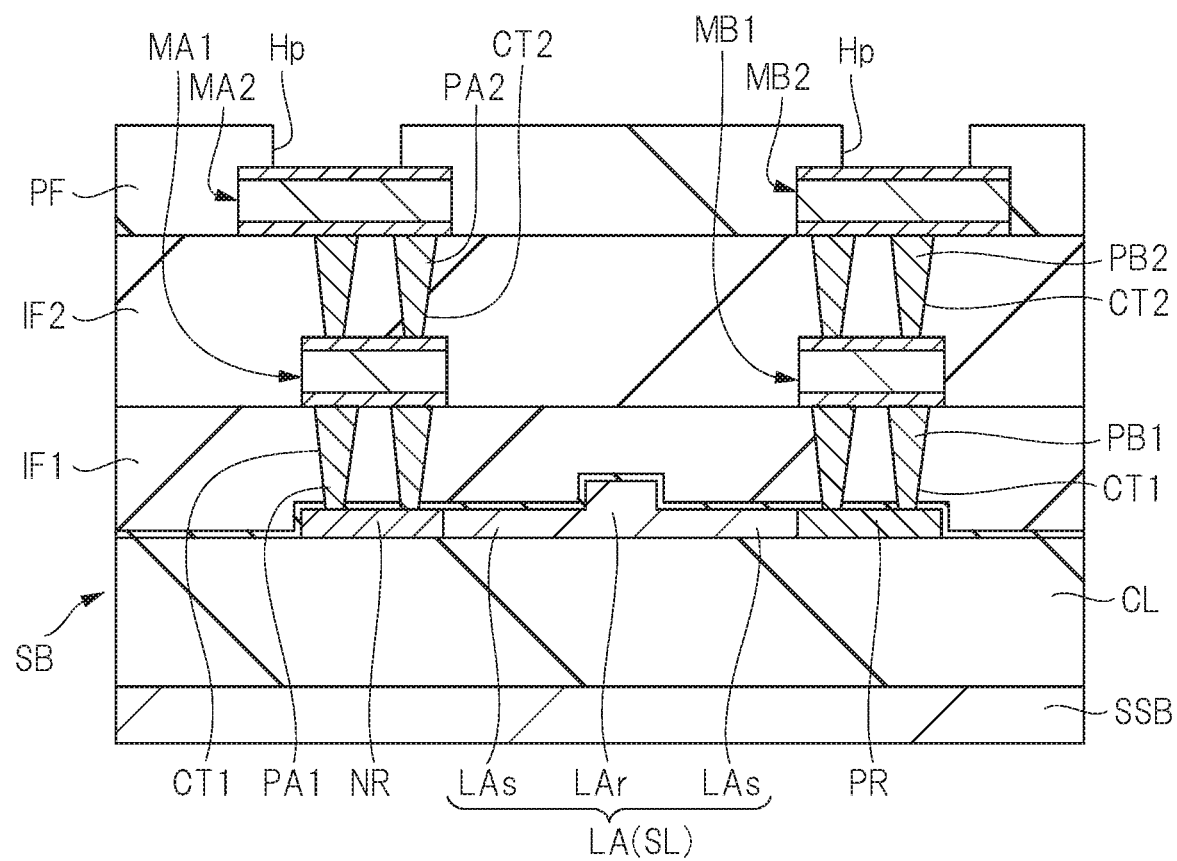
FIG. 3 is a cross-sectional view illustrating the device structure of the optical modulator according to the first embodiment.

FIG. 3 is a cross-sectional view illustrating the device structure of the optical modulator LM according to the first embodiment. As shown in FIG. 3, the substrate SI composed of an SOI (Silicon on Insulator) substrate having a supporting substrate SSB, an insulating layer CL formed on the supporting substrate SSB, and a semiconducting layer SL formed on the insulating layer CL. However, the substrate SB is not limited to a substrate having the supporting substrate SSB, and for example, a substrate having a two-layer structure in which a semiconductor layers provided over an insulating layer (sapphire, quartz, or the like) which does not have a supporting substrate itself and functions as a supporting substrate, such as an Silicon on Sapphire (SOS) substrate, may be used.

The support substrate SSB of the lowermost layer is made of, for example, a p-type silicon (Si) single crystal having a plane orientation of (100) and a resistivity of about 5 to 50 Ωcm. The intermediate insulating layer CL is also called a Buried Oxide (BOX) layer, and is formed of, for example, a silicon oxide film. The thickness of the insulating layer CL is, for example, 1 μm or more, specifically, about 2 μm to 3 μm in order to reduce optical loss. In addition, by increasing the thickness of the insulating layer CL, the capacitance between the supporting substrate SSB and the semiconductor layer SL can be reduced. The uppermost semiconductor layer SL is also called an SOI layer or an element forming layer, and is composed of, for example, a Si single crystal film. The thickness of the semiconductor layer SL is, for example, about 180 nm to 250 nm.

Silicon (Si) constituting the semiconductor layer SL is a material having a light-transmitting property with respect to, for example, light in a 1.3 to 1.6 μm band (communication wavelength band) for optical communication, and the refractive index of silicon is, for example, 3.5 with respect to light in the wavelength band. As will be described later, the semiconductor layer SL made of silicon constitutes a core layer for propagating light. On the other hand, the refractive index of the silicon oxide ($SiO_2$) constituting the insulating layer CL is lower than the refractive index of the semiconductor layer SL, and is, for example, 1.45 with respect to the light of the relevant wavelengths, and the insulating layer CL constitutes a clad layer (clad portion).

An optical waveguide LA is formed on the main surface of the substrate SB configured in this manner, i.e., on the insulating layer CL, and an insulating film IF1 is formed so as to cover the optical waveguide LA. The optical waveguide LA functions as a core layer for propagating light along the main surface of the substrate SB, and is formed of the above-described semiconductor layer SL. On the insulating film IF1 covering the optical waveguide LA, a wiring MA1 and a wiring MB1, and an insulating film IF2 are formed so as to cover the wiring MA1 and the wiring MB1. Further, on the insulating film. IF2, a wiring MA2 and a wiring MB2, and a protective film PF are formed so as to cover the wiring MA2 and the wiring MB2.

Hereinafter, these configurations will be described.

(Optical Waveguide LA)

The optical waveguide LA exemplifies an optical waveguide constituting an electrically controlled optical modulator (LM) which electrically controls (modulates) the phase of light propagating in the optical waveguide LA. The optical waveguide LA has, for example, a convex cross-sectional shape that intersects with the propagation direction of an optical signal. That is, the optical waveguide LA integrally has a relatively thick rib portion LAr and a relatively thin slab portion LAs formed on both sides in the width direction (a short direction, a direction crossing the light propagation direction, and along the main surface).

The rib portion LAr is a portion that mainly transmits light. The rib portion LAr is disposed at the center in the width direction of the optical waveguide LA (the short direction, the direction crossing the light propagation direction and along the main surface) and is formed thicker than the slab portion LAs so as to project upward from the upper surface of the slab portion LAs in a cross-sectional view. That is, the height of the upper surface of the rib portion LAr from the upper surface of the insulating layer CL is higher than the height of the upper surface of the slab portion LAs from the upper surface of the insulating layer CL. The height (thickness) of the rib portion LAr is formed to be substantially the same along the light propagation direction, and is, for example, about 180 nm to 250 nm. The width (dimension in the short direction) of the rib portion LAr is formed to be substantially the same along the light propagation direction, and is, for example, about 300 nm to 400 nm.

The slab portion LAs is a portion for mainly supplying a potential to the optical waveguide LA. The height (thickness) of the slab portion LAs is formed to be substantially the same along the light propagation direction, and is, for example, about 100 nm. An n+ type semiconductor region NR is formed at an outer end portion of one width-direction slab portion LAs of the rib portion LAr, and a p+ type semiconductor region PR is formed at an outer end portion of the other width-direction slab portion LAs of the rib portion LAr. The length of the semiconductor region NR and the length of the semiconductor region PR in the width direction of the rib portion LAr may be as long as carriers can be supplied, and is, for example, about 0.5 μm. In addition, when light propagates in the rib portion LAr serving as the optical waveguide, it is preferable to suppress the occurrence of light propagation loss due to light seeping out of the rib portion LAr being scattered by the conductivity type impurities existing inside the semiconductor region NR and the semiconductor region PR. From this viewpoint, it is preferable that the distance from the end in the width direction of the rib portion LAr to the end of the semiconductor region NR (the width of the slab portion LAs) and the distance from the end in the width direction of the rib portion LAr to the end of the semiconductor region PR (the width of the slab portion LAs) are large to some extent. These spacings are, for example, greater than 1 μm. (=1.5/1.45). The n+ type semiconductor region NR contains, for example, phosphorus (P) or arsenic (As), and the p+ type semiconductor region PR contains, for example, boron (B).

The slabs LAs and the ribs LAr between the n+ type semiconductor region NR and the p+ type semiconductor region PR are formed of, for example, an intrinsic semiconductor (i.e., an i (intrinsic) type semiconductor). That is, the optical waveguide LA has, for example, a pin junction diode structure. However, the structure of the optical waveguide LA is not limited to the pin junction diode structure and can be variously changed, and a pn junction diode structure or a SIS (Semiconductor Insulator Semiconductor) structure may be used. In the pn junction diode structure, an n-type semiconductor region in contact with the n+ type semiconductor region NR and a p-type semiconductor region in contact with the p+ type semiconductor region PR are formed in the semiconductor layer SL constituting the optical waveguide LA, and the p-type semiconductor region and the n-type semiconductor region are contact with each other at the ribs LAr to form a pn junction. On the other hand, in the case of the SIS structure, a semiconductor layer for control is provided on the semiconductor layer SL constituting the optical waveguide LA via a dielectric layer.

The n+ type semiconductor region NR is electrically connected to the wiring MA1 through a plurality of plugs PA1, and the p+ type semiconductor region PR is electrically connected with the wiring MB1 through a plurality of plugs PB1. Each of the plug PA1 and the plug PB1 is formed by filling a conductor film made of, for example, tungsten (W) in the contact hole CT1 drilled in the insulating film IF1. Incidentally, the impurity concentrations of the n+ type semiconductor regions NR are set so that the semiconductor regions NR contact the plugs PA1 in an ohmic contact manner. Similarly, the impurity concentrations of the p+ type semiconductor regions PR are set so that the semiconductor regions PR are in ohmic contact with the plugs PB1.

Each of the wirings MA1 and MB1 is composed of, for example, a laminated film in which titanium (Ti), titanium nitride (TiN), aluminum (Al), titanium nitride (TiN), and titanium (Ti) are laminated in this order. However, instead of aluminum (Al), copper (Cu) or tungsten (W), for example, can be used. The laminated film of titanium (Ti) and titanium nitride (TiN) is a barrier metal layer. The interconnection MA1 is formed so as to overlap, for example, the n+ type semiconductor region NR of the optical waveguide LA in plan view. On the other hand, the interconnection MB1 is formed so as to overlap the p+ type semiconductor region PR of the optical waveguide LA in plan view.

As shown in FIG. 3, the wiring MA1 is electrically connected with the wiring MA2 through a plurality of plugs PA2, and the wiring MB1 is electrically connected with the wiring MB2 through a plurality of plugs PB2. Each of the plug PA2 and the plug PB2 is formed by filling a conductor film such as tungsten (W) in the contact hole CT2 drilled in the insulating film IF2. The respective configurations of the wiring MA2 and the wiring MB2 are, for example, the same as those of the wiring MA1 and the wiring MB1 described above.

The protective film PF covering the wiring MA2 and the wiring MB2 is formed of, for example, silicon oxide, silicon oxynitride, PSG (Phospho Silicate Glass), or silicon nitride (SiN). An opening Hp is formed in a part of the protective film. PF, and a part of the wiring MA2 and the wiring MB2 is exposed. The exposed portions of the wirings MA2 and MB2 are pad portions for connecting to external wirings.

In the optical waveguide LA constituting such an electrically controlled optical modulator (LM), the phase of light is modulated by utilizing the carrier plasma effect (a phenomenon in which the refractive index of the optical waveguide LA depends on the concentration of carriers (electron-hole pairs) in the semiconductor constituting the optical waveguide LA). That is, in the optical waveguide LA having the pin junction diode structure, by applying a forward bias (reverse bias) to the diode, carriers are injected into the optical waveguide LA (mainly the rib portion LAr) (carriers are extracted), and the refractive index of the optical waveguide LA (mainly the rib portion LAr) is decreased (increased) to modulate the phase of light. In the optical waveguide LA having the pn junction diode structure or the SIS structure, by applying a voltage to the semiconductor layer for control, carriers are injected (carriers are extracted) into the optical waveguide LA (mainly the rib portion LAr), and the refractive index of the optical waveguide LA (mainly the rib portion LAr) is decreased (increased) to modulate the phase of light.

(Insulating Film)

The insulating films IF1 and IF2 are insulating films that function as clad layers for confining light in the optical waveguide LA, and are desirably formed of, for example, the same material as the insulating layer CL. The thickness of the insulating film IF1 is, for example, about 1 μm to 2 μm. The total thickness of the insulating films IF1 and IF2 is, for example, about 2 μm to 5 μm. Here, when the refractive index of the optical waveguide LA (semiconductor layer SL) is n1 and the refractive indices of the insulating layer CL, the insulating film IF1, and the insulating film IF2 are n2, the relationship of n1>n2 is satisfied. By surrounding the optical waveguide LA having a relatively large refractive index with the lower insulating layer CL and the upper insulating films IF1 and IF2 having a relatively small refractive index as described above, light can be propagated while being confined inside the optical waveguide LAB.

Next, the device structures of the input/output element constituting the optical circuits LC2 and LC3 will be described.

Figure 4:
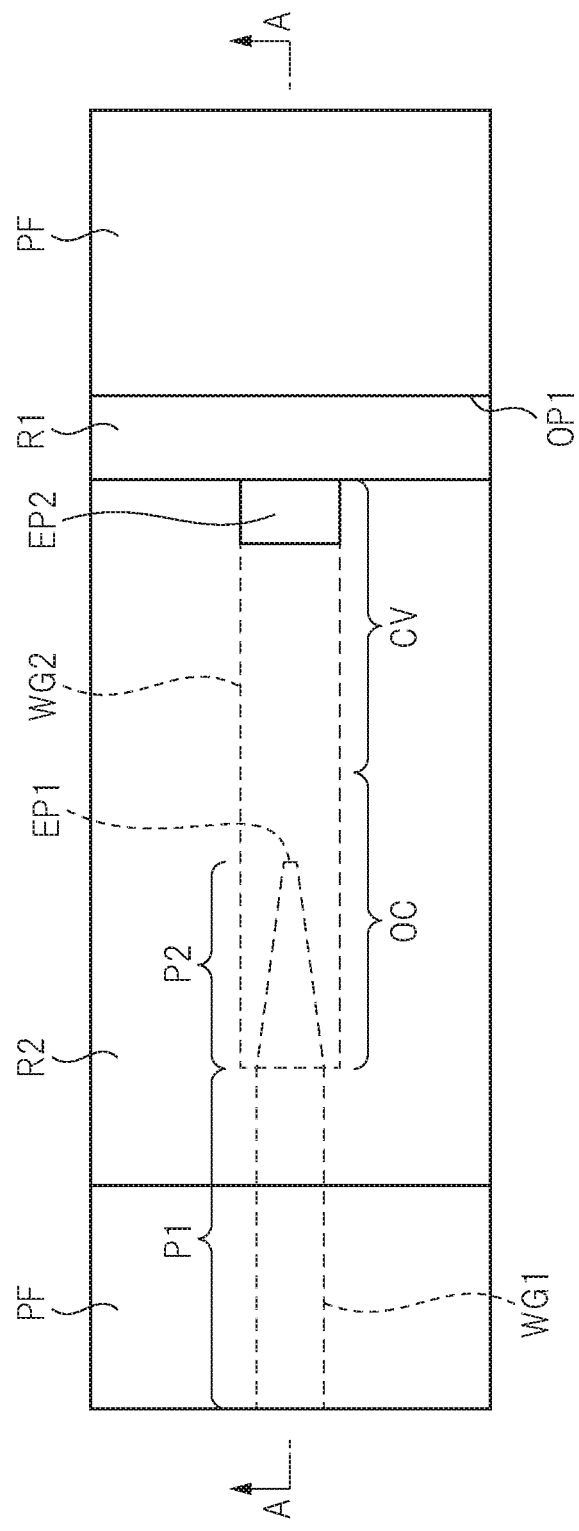
FIG. 4 is a plan view illustrating the device structure of the input/output element according to the first embodiment.

FIG. 4 is a plan view illustrating the device structure of the input/output element according to the first embodiment. In FIG. 4, the input/output element according to the first embodiment has, for example, an optical waveguide WG1 extending in the x direction and an optical waveguide WG2 optically connected with the optical waveguide WG1.

The optical waveguide WG1 is made of, for example, silicon, germanium, or the like. Here, as shown in FIG. 4, the optical waveguide WG1 includes a portion P1 having a line shape whose width (length of the optical waveguide WG1 in the y direction) is substantially the same, and a portion P2 which is one end portion having a tapered shape whose width becomes narrower as closing the end surface EP1 of the optical waveguide WG1. In other words, the width of the optical waveguide WG1 in the direction (y direction) orthogonal to the extending direction (x direction) of the optical waveguide WG1 decreases as closing the end surface EP1 of one end portion (portion P2) of the optical waveguide WG1. The tapered portion P2 constitutes a part of the optical waveguide WG1 and also constitutes a part of the spot size converter.

The optical waveguide WG2 has an optical coupling portion OC that overlaps with the optical waveguide WG1 in plan view and is optically connected with the optical waveguide WG1, and a curved portion CV connected with the optical coupling portion OC and curved in the z direction. Here, in plan view, the optical coupling portion OC of the optical waveguide WG2 and the portion P2 of the optical waveguide WG1 have portions overlapping with each other.

This optical waveguide WG2 differs from the optical waveguide WG1, which consists of silicon and gelmanium, in that it consists of resin represented by ultraviolet curable resin and heat curable resin.

In FIG. 4, the optical waveguide WG2 is formed inside the opening OP1, and the resin R2 and the resin R1 having a refractive index smaller than that of the optical waveguide WG2 are filled in the opening OP1. The optical waveguide WG2 is surrounded by the resin R1 and the resin R2. The optical waveguide WG2 is curved in the z direction, and is formed to extend from one end portion of the optical waveguide WG1 to the upper surface of the resin R2. As a result, as shown in FIG. 4, the EP2 surface of the end portion of the optical waveguide WG2 is exposed from the top of resin R2 (resin R1). On the other hand, a protective film. PF is formed outside the opening OP1, and the optical waveguide WG1 is formed so as to extend from the outside of the opening OP1 to the inside of the opening OP1. For example, as shown in FIG. 4, the opening OP1 is formed so as to partially overlap with the optical waveguide WG1 in plan view. That is, the opening OP1 is formed so as to overlap with one end portion P2 of the optical waveguide WG1 in plan view.

Figure 5:
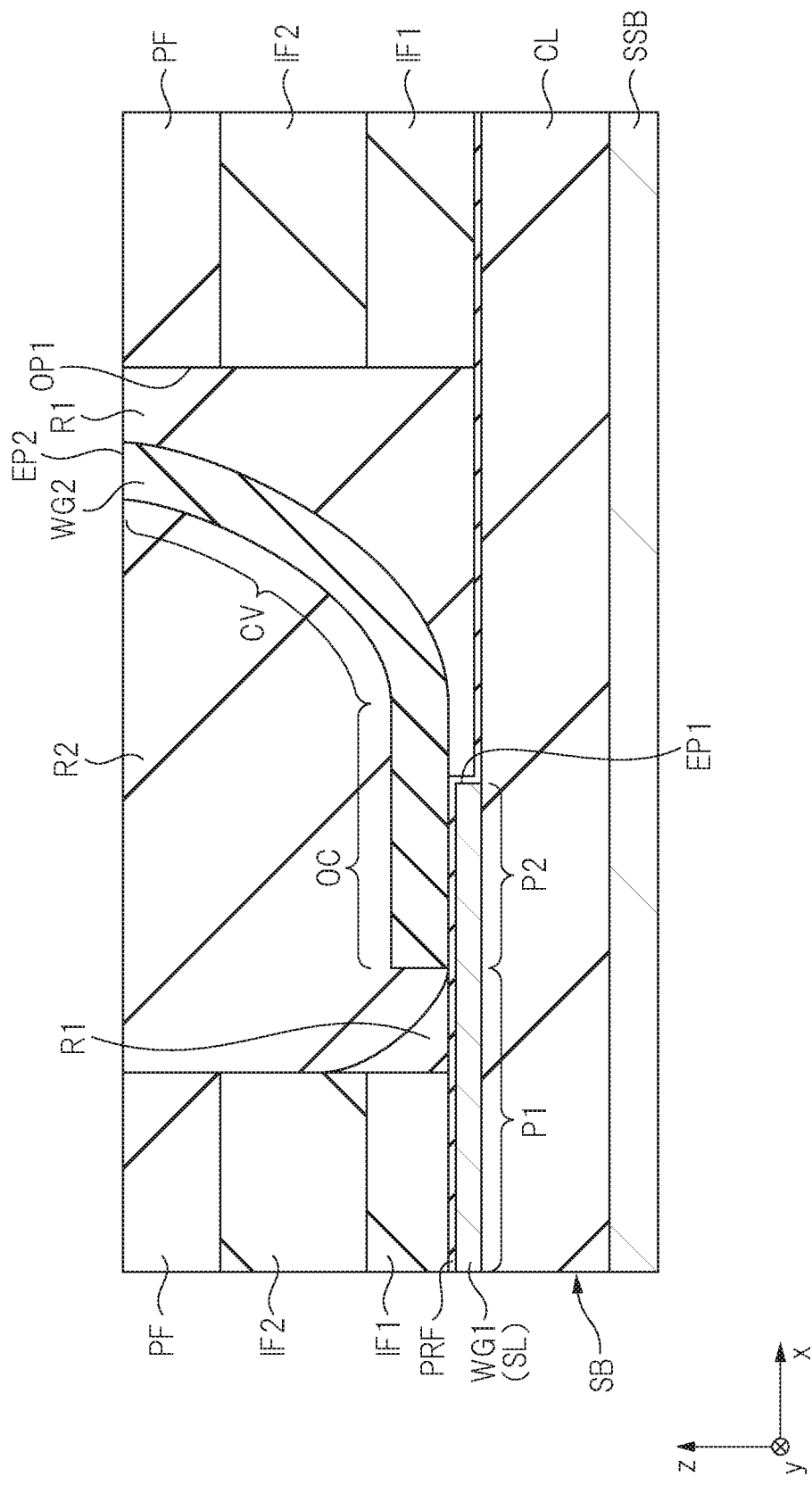
FIG. 5 is a cross-section diagram taken along the A-A line in FIG. 4.

Next, FIG. 5 is a cross-sectional view taken along line A-A of FIG. 4. As shown in FIG. 5, an optical waveguide WG1 made of a semiconductor layer SL is formed on the insulating layer CL, and the optical waveguide WG1 includes a portion P1 and a portion P2. The optical waveguide WG1 functions as a core layer through which light propagates, while the insulating layer CL1 has a smaller refractive index than the optical waveguide WG1 through which light propagates, and functions as a clad layer. A protective film PRF made of, for example, a silicon oxide film is formed on the optical waveguide WG1 to the insulating layer CL.

An insulating film IF1 is formed on the protective film PRF, and an insulating film IF2 is formed on the insulating film IF1. Further, a protective film PF is formed on the insulating film IF2. At this time, the multilayer film composed of the insulating film IF1, the insulating film IF2, and the protective film PF has a refractive index smaller than that of the optical waveguide WG1, and functions as a clad layer. As shown in FIG. 5, an opening OP1 penetrating the multilayer film is formed in the multilayer film, and the protective film PRF is exposed at the bottom surface of the opening OP1.

Here, the protective film PRF is provided in order to suppress damage to the optical waveguide WG1 due to etching used in forming the opening OP1. That is, when the protective film PRF is not formed on the optical waveguide WG1, the surface roughness of the upper surface of the optical waveguide WG1 is increased by etching when the opening OP1 is formed. This means that scattering of the light propagating in the optical waveguide WG1 is increased by the concave-convex shape formed on the upper surface of the optical waveguide WG1, and this adversely affects the characteristics of the light propagating in the optical waveguide WG1. In contrast, in the first embodiment, a protective film PRF is formed on the optical waveguide WG1. Therefore, the presence of the protective film PRF can suppress damage caused by etching used in forming the opening OP1 from reaching the optical waveguide WG1. As a result, according to the first embodiment, the opening OP1 can be formed without deteriorating the characteristics of the light propagating through the optical waveguide WG1.

Subsequently, as shown in FIG. 5, one end portion of the optical waveguide WG1 is formed inside the opening OP1, and an optical waveguide WG2 optically connected to the optical waveguide WG1 is formed. Resin R1 and resin R2 are formed so as to bury the inside of the opening OP1. The resin R1 and the resin R2 have a refractive index smaller than that of the optical waveguide WG2, and function as a clad layer. Here, for example, as a semiconductor device (product), the resin R1 and the resin R2 are treated together as a third clad layer. On the other hand, as a manufacturing method of a semiconductor device to be described later, the resin R1 is handled as a third clad layer and the resin R2 is handled as a fourth clad layer by using the resin R1 and the resin R2 as separate components.

The optical waveguide WG2 has an optical coupling portion OC overlapping the portion P2 of the optical waveguide WG1 in plan view and is optically connected with the optical waveguide WG1, and a curved portion CV connected with the optical coupling portion OC and curved in the z direction. As a result, as shown in FIG. 5, the optical waveguide WG2 is formed so as to reach the upper surface of the resin R1 (resin R2) from one end portion (portion P2) of the optical waveguide WG1. Here, as shown in FIG. 5, a protective film PRF having a refractive index smaller than that of the optical waveguide WG1 or the optical waveguide WG2 is formed between the optical waveguide WG1 and the optical waveguide WG2. Therefore, it is questionable whether the optical waveguide WG1 (portion P2) and the optical waveguide WG2 (optical coupling portion OC) can be optically connected. In this regard, for example, since the thickness of the protective film. PRF is formed to be thinner than the light seepage distance, even if the protective film. PRF exists, the evanescent light enables the optical connection between the optical waveguides WG1 and WG2. In addition, the term "the optical waveguide WG2 is formed so as to "reach" the upper surface of the resin R1 (resin R2) does not necessarily mean that the optical waveguide WG2 completely reaches the upper surface of the resin R1 (resin R2) For example, the optical waveguide WG2 may substantially reach the upper surface of the resin R1 (resin R2) to such an extent that the light emitted from the optical waveguide WG2 can reach the outside.

(Desirable Configuration Example of Curved Portion)

For the curved portion CV of the optical waveguide WG2 according to the first embodiment, there is a desirable configuration example from the viewpoint of improving the optical characteristics of the input/output element. Therefore, in the following, this point will be described in detail.

For example, if the radius of curvature of the curved portion CV is too smaller than the allowable range determined by the refractive index difference between the core layer (the optical waveguide WG2) and the clad layer (the resin R1 and the resin R2), the radiation loss in the curved portion CV becomes several times the propagation loss in the optical coupling portion OC which is a straight line portion, and the waveguide characteristic (optical characteristic) in the optical waveguide WG2 is extremely lowered. On the other hand, if the radius of curvature of the curved portion CV is too larger than the allowable range determined by the refractive index difference between the core layer (the optical waveguide WG2) and the clad layer (the resin R1 and the resin R2), the planar occupation area of the optical waveguide WG2 becomes large, which hinders high integration of the optical circuit, and therefore, it is not desirable from the standpoint of realizing high integration of the optical circuit.

Therefore, for example, when the refractive index difference Δ between the core layer (the optical waveguide WG2) and the clad layer (the resin R1 and the resin R2) is 10%, the curvature radius of the curved portion CV is desirably 10 μm or more and 100 μm or less. For example, when the refractive index difference Δ between the core layer (the optical waveguide WG2) and the clad layer (the resin R1 and the resin R2) is 25%, the curvature radius of the curved portion CV is desirably 1 μm or more and 10 μm or less.

Further, if the width and thickness of the curved portion CV are too small, the propagation loss and the radiation loss of the optical waveguide WG2 increase. On the other hand, if the width and the thickness of the curved portion CV are too large, the conversion of the optical mode occurs abruptly inside the optical waveguide WG2, so that energy loss occurs. Furthermore, it is necessary to adjust the width and thickness of the curved portion CV to a level corresponding to the size of the light receiving surface of the optical fiber or the external waveguide. This is because the optical coupling loss between the optical waveguide WG2 and the external waveguide (optical fiber) can be reduced by doing so.

Therefore, for example, when the refractive index difference Δ between the core layer (optical waveguide WG2) and the clad layer (resin R1 and resin R2) is 10%, the width and thickness of the curved portion CV are desirably 1 μm or more and 10 μm or less. Further, for example, when the refractive index difference Δ between the core layer (optical waveguide WG2) and the clad layer (resin R1 and resin R2) is 25%, the width and thickness of the curved portion CV are desirably 0.5 μm or more and 5 μm or less.

(Propagation of Light in Input/Output)

The input/output element according to the first embodiment is configured as described above, and the propagation of light in the input/output element according to the first embodiment will be described below. First, in FIG. 1, the phase of the light emitted from the light source LS is modulated by the optical modulator LM included in the optical circuit LC1. Thereafter, the light whose phase has been modulated by the optical circuit LC1 enters an input/output element included in the optical circuit LC2. For example, in the input/output element shown in FIG. 5, light whose phase is modulated by the optical circuit LC1 propagates through the optical waveguide WG1. Specifically, the light whose phase is modulated by the optical circuit LC1 propagates from the portion P1 of the optical waveguide WG1 to the portion P2 functioning as a spot size converter. Here, the light propagating inside the optical waveguide WG1 from the portion P1 to the portion P2 of the optical waveguide WG1 gradually increases in spot size due to the diffraction effect in the portion P2 which is the tapered portion. As a result, the distribution of the laser light moves from the optical waveguide WG1 to the optical coupling portion OC of the optical waveguide WG2. Thereafter, the light having the expanded spot size propagates through the optical waveguide WG2 and is output to the outside of the input/output element from the end surface EP2 of the optical waveguide WG2. As described above, the light whose phase is modulated by the optical circuit LC1 by the input/output element included in the optical circuit LC2 is output to the outside of the photoelectric hybrid device LE.

On the other hand, in FIG. 1, light input from the outside of the photoelectric hybrid device LE enters an input/output element included in the optical circuit LC3. For example, in the input/output element shown in FIG. 5, the light incident on the input/output element reaches the optical coupling portion of the optical waveguide WG2 from the end surface EP2 of the optical waveguide WG2 via the curved portion CV of the optical waveguide WG2. Then, for example, when light propagates from the optical waveguide WG2 to the optical waveguide WG1, the spot size is gradually reduced by the portion P2 of the optical waveguide WG1 functioning as a spot size converter. Thereafter, the light whose spot size has been reduced by the portion P2 of the optical waveguide WG1 functioning as the spot size converter propagates through the optical waveguide WG1. As described above, light taken into the interior of the photoelectric hybrid device LE from the outside by the input/output element included in the optical circuit LC3 propagates through the optical waveguide WG1 of the input/output element included in the optical circuit LC3. Thereafter, the light propagating through the optical waveguide WG1 is input to a photodetector constituting the optical circuit LC4 formed on the same semiconductor chip SC4 as the optical circuit LC3, and is converted into an electric signal.

(Configuration of Photodetector)

Figure 6:
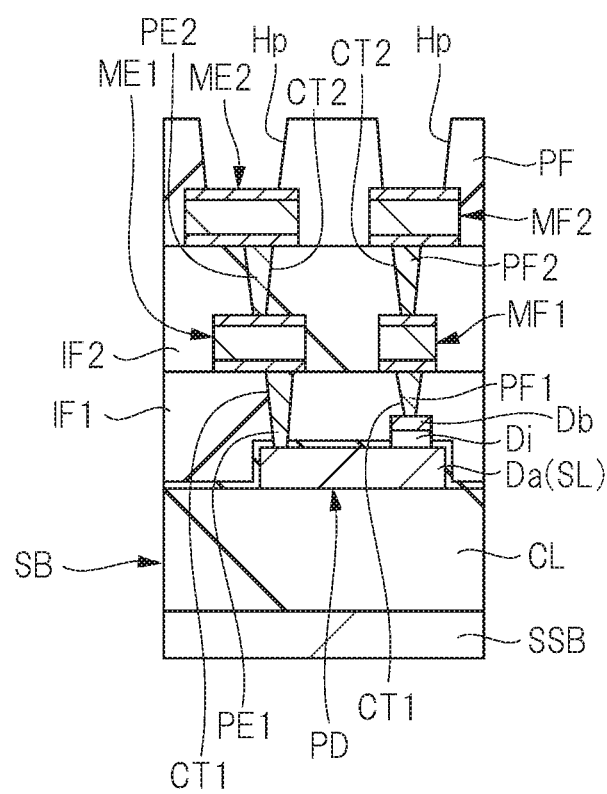
FIG. 6 is a cross-sectional view illustrating the device structure of a photodetector according to the first embodiment.

Next, a device structure of a photodetector constituting the optical circuit LC4 will be described. FIG. 6 is a cross-sectional view illustrating the device structure of the photodetector according to the first embodiment.

The photodetector PD is a photoelectric converter that converts an optical signal to an electric signal. FIG. 6 illustrates a photodetector PD having a vertical pin junction diode structure. That is, as shown in FIG. 6, the light receiver PD has a p-type semiconductor layer Da formed on the insulating layer CL, an i-type semiconductor layer Di formed on the p-type semiconductor layer Da, and an n-type semiconductor layer Db formed on the semiconductor layer Di.

The p-type semiconductor layer Da is formed by introducing a p-type impurity (acceptor) such as boron (B) into the semiconductor layer SL. The i-type semiconductor layer Di is made of, for example, germanium (Ge), and is formed of an intrinsic semiconductor. The n-type semiconductor layer Db is formed by, for example, introducing a predetermined impurity into a Ge layer. The lower semiconductor layer Da may be an n-type semiconductor layer, and the upper semiconductor layer Db may be a p-type semiconductor layer. The photodetector PD can be manufactured, for example, by a method similar to that of a photodetector known as a photodetector of silicon photonics.

The p-type semiconductor layer Da is electrically connected with the wiring ME1 through the plug PE1, and the n-type semiconductor layer Db is electrically connected with the wiring MF1 through the plug PF1. Each of the plug PE1 and the plug PF1 is formed by embedding a conductor film made of, for example, tungsten (W) in the contact hole CT1 drilled in the insulating film IF1. The configurations of the wiring ME1 and the wiring MF1 are, for example, the same as those of the wiring MA1 and the wiring MB1.

The wiring ME1 is electrically connected with the wiring ME2 through the plug PE2, and the wiring NF1 is electrically connected with the wiring MF2 through the plug PF2. Each of the plug PE2 and the plug PF2 is formed by embedding a conductor film made of, for example, tungsten (W) in the contact hole CT2 drilled in the insulating film IF2. The configurations of the wirings ME2 and MF2 are the same as those of the wirings MA2 and MB2, for example. An opening Hp is formed in a part of the protective film PF to expose a part of each of the wiring ME2 and the wiring MF2. The exposed portions of the wirings ME2 and MF2 are connection pad portions for the photodetector PD.

On the light receiver PD, an insulating film IF1, an insulating film IF2, and a protective film PF are deposited in order from the lower layer. As described above, the light receiver PD is configured.

(Feature Points)

Next, feature points on the structure according to the first embodiment will be described. The first embodiment is characterized in that, for example, as shown in FIG. 5, the optical input/output element does not include a grating coupler, but includes an optical waveguide WG1 formed in a planar manner, and a three-dimensional optical waveguide WG2 optically connected to the optical waveguide WG1 and including a curved shape.

As a result, according to the feature of the first embodiment, the input/output element for propagating light can be stereoscopically formed while the grating coupler is deleted from the input/output element, and as a result, the semiconductor device including the input/output element can be miniaturized.

For example, in order to realize miniaturization of semiconductor device by three-dimensionally forming an optical input/output element, in a general input/output element, the propagation direction of light is changed by a grating coupler including a diffraction grating. As a specific example, for example, light propagating in the horizontal direction (lateral direction) is incident on the grating coupler, and light is emitted obliquely upward from the grating coupler, thereby changing the propagation direction of the light. At this time, the reason why the light is emitted from the grating coupler not in the vertical direction (upward direction) but in the obliquely upward direction is to reduce the light loss in the grating coupler. That is, in the grating coupler, the light loss can be reduced by setting the light emission direction to a slightly inclined upward direction rather than a vertical direction. The light emitted from the grating coupler is extracted to the outside of the semiconductor device by using an optical pin (optical waveguide). Here, since the propagation direction of the light emitted from the grating coupler is direction inclined from the vertical direction, it is necessary to arrange the optical pins so as to be inclined with respect to the surface of the substrate. Since the optical pins are arranged inclined with respect to the surface of the substrate, it is necessary to incline the optical pins with respect to the surface of the substrate so that an optical fiber externally attached to the outside of the semiconductor device is also connected to the inclined optical pins. Thus, when a grating coupler is used to form an optical input/output element three-dimensionally, high alignment accuracy between an optical fiber and a semiconductor device is required to reduce optical loss. In other words, in an optical input/output element using a grating coupler, it is difficult to optically connect an optical fiber and semiconductor device (input/output element) with low loss. That is, when a grating coupler used to form an optical input/output element three-dimensionally, there is an increased possibility that characteristics of a semiconductor device including the optical input/output element are deteriorated.

On the other hand, in the first embodiment, for example, as shown in FIG. 5, an optical input/output element is configured by an optical waveguide WG1 formed in a planar manner and a three-dimensional optical waveguide WG2 optically connected with the optical waveguide WG1 and having a curved shape without using a grating coupler. As a result, according to the optical input/output element according to the first embodiment, since a grating coupler is not used, high alignment accuracy between the optical fiber and the semiconductor device is not required. That is, as shown in FIG. 5, since the end surface EP2 of the optical waveguide WG2 is not inclined with respect to the surface of the substrate SB and is horizontal, it is unnecessary to arrange the optical fiber connected with the optical waveguide WG2 so as to be inclined with respect to the substrate SB. Therefore, according to the optical input/output element according to the first embodiment, since high alignment accuracy between the optical fiber and the semiconductor device (input/output element) is not required in order to reduce the optical loss as compared with the configuration using the grating coupler, it is possible to realize a stereoscopic input/output element while reducing the optical loss.

That is, by employing the optical input/output element in the first embodiment, the improvement of the characteristics of the semiconductor device (input/output element) due to the reduction of the optical loss and the reduction of the size of the semiconductor device (input/output element) due to the stereoscopic input/output element can be achieved at the same time. Since the optical input/output element according to the first embodiment does not require a grating coupler, further miniaturization of the semiconductor device can be achieved.

As described above, since the optical input/output element according to the first embodiment includes the three-dimensionally curved optical waveguide WG2 serving as an interface between the planar optical waveguide WG1 and the optical fiber provided outside the semiconductor device, the degree of freedom of the connection position between the input/output element and the optical fiber can be improved without using a grating coupler. As a result, it becomes easy to adopt a mounting structure capable of reducing the area occupied by the optical input/output element, and this makes it possible to miniaturize the semiconductor device including the input/output element.

For example, as shown in FIG. 5, by employing a three-dimensionally curved optical waveguide WG2, vertical input and output of light becomes possible, and further by changing the three-dimensional shape of the optical waveguide WG2, it is possible to improve the degree of freedom to change the input and output angle, the height and position of the input and output surfaces, and the cross-sectional shape and size of the optical waveguide WG2. This makes it easier to change the connection position with the externally arranged optical fiber to an appropriate position even if the input/output element is arranged at a higher density than, for example, an input/output element using a grating coupler in which the output position is uniquely fixed, thereby obtaining an advantage of facilitating the design of an optical circuit.

Furthermore, as will be described later, the three-dimensionally curved optical waveguide WG2 can be easily formed using, for example, a nanoimprint technique. Therefore, since the three-dimensionally curved optical waveguide WG2 according to the first embodiment can be stably manufactured and can be manufactured by a technically established nanoimprint technique, the manufacturing cost can be reduced. As described above, according to the first embodiment, since the nanoimprint technique is used as the manufacturing technique of the optical waveguide WG2, for example, another material different from the optical waveguide WG1 formed by a combination of the photolithography technique and the etching technique (patterning technique) is used. Specifically, the optical waveguide WG1 is composed of a material including silicon, while the optical waveguide WG2 is composed of a curable resin typified by an ultraviolet curable resin or a thermosetting resin.

In addition, while the grating coupler has wavelength dependence, the optical input/output element according to the first embodiment, which is composed of the optical waveguide without using the grating coupler, has wavelength dependence smaller than that of the grating coupler. Therefore, the optical input/output element according to the first embodiment is effective when applied to, for example, optical communication of a wavelength division multiplexing system in which a plurality of lights having different wavelengths are propagated through one optical fiber.

In the optical input/output element according to the first embodiment, for example, as shown in FIG. 4, the optical waveguide WG1 has a portion P1 having substantially the same width and a portion P2 having a tapered shape, and the tapered portion P2 also functions as a spot size converter. The portion P2 of the optical waveguide WG1 overlaps the optical coupling portion OC of the optical waveguide WG2 in plan view, and contributes to the optical connection between the optical waveguide WG1 and the optical waveguide WG2. That is, although the optical input/output element according to the first embodiment is composed of the optical waveguide WG1 and the three-dimensionally curved optical waveguide WG2, this input/output element has not only a function of changing the propagation direction of light but also a function of serving as a spot size converter for changing the spot size of light. As a result, according to the optical input/output element according to the first embodiment, the optical loss based on the difference between the spot size of the light propagating in the optical fiber provided outside the semiconductor device (input/output element) and the spot size of the light propagating in the optical waveguide WG1 of the input/output element is reduced.

For example, in an input/output element using a grating coupler, it is difficult to make the function as a spot size converter inherent in the grating coupler itself. Therefore, in the input/output element using the grating coupler, it is necessary to provide a spot size converter for reducing the connection loss with the optical fiber separately from the grating coupler. This means that the size of the input/output element becomes large in the input/output element using the grating coupler, which hinders the miniaturization of the semiconductor device.

On the other hand, according to the optical input/output element according to the first embodiment, by forming the portion P2 serving as the tapered portion with respect to the optical waveguide WG1, not only the function of changing the propagation direction of light but also the function as a spot size converter for changing the spot size of light can be incorporated in the input/output element composed of the optical waveguide WG1 and the optical waveguide WG2. That is, according to the optical input/output element according to the first embodiment, the optical waveguide WG2 that is three-dimensionally curved has a function of changing the propagation direction of light, and the optical waveguide WG1 also has a function as a spot size converter, whereby a semiconductor device having excellent optical characteristics of low loss can be realized while miniaturization of the semiconductor device (input/output element) is achieved.

The optical input/output element according to the first embodiment has a three-dimensionally curved optical waveguide WG2, and the manufacturing method of the optical waveguide WG2 also has a characteristic point. In particular, the first embodiment is characterized in that the optical waveguide WG2 is formed by a nanoimprint technique. Therefore, in the following, first, an outline of the nanoimprint technique will be described. After the method of manufacturing the semiconductor device according to the first embodiment using the nanoimprint technique is described, the characteristic points of the method of manufacturing the semiconductor device according to the first embodiment will be described.

(Nanoimprint Technique)

Briefly, the nanoimprint technique is a technique for realizing fine processing by pressing a pressing member (original plate) against a substrate without using an exposure apparatus. Advantages of this nanoimprint technique when used in a manufacturing process of a semiconductor device can be summarized into three points: (1) high resolution, (2) excellent dimensional controllability, and (3) low cost.

Hereinafter, a nanoimprint technique will be described with reference to the drawings.

Figure 7:
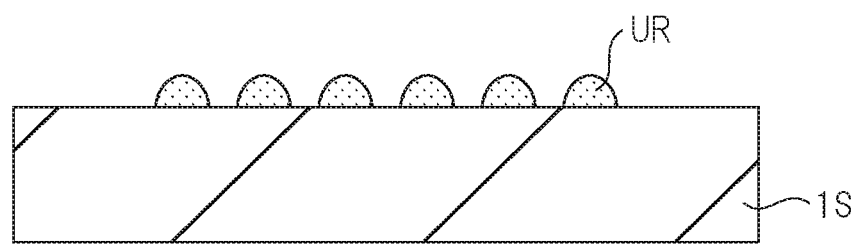
FIG. 7 is a diagram explaining the nano-imprint technology.

First, as shown in FIG. 7, for example, an ultraviolet curable resin UR is provided onto the substrate 1S.

Figure 8:
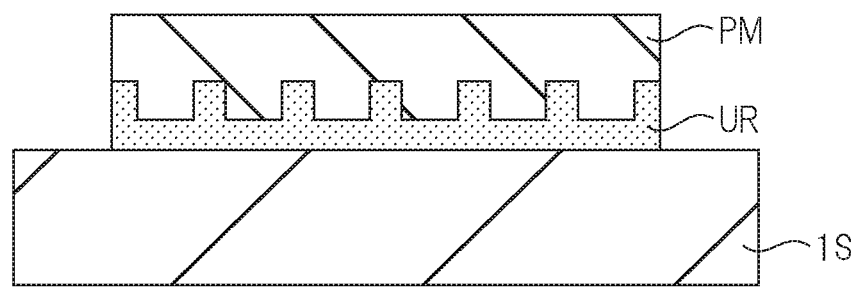
FIG. 8 is a diagram explaining the nano-imprint technology.

Next, as shown in FIG. 8, the pressing member PM in which the concavo-convex shape is formed is pressed against the substrate 1S to which the ultraviolet curable resin UR is applied. For example, the pressure for pressing the pressing member PM against the substrate 1S is about 0.1 MPa to 10 MPa, and the pressing time is about 10 seconds to 10 minutes, for example. As a result, the concavo-convex shape is formed on the ultraviolet curable resin UR so as to reflect the concavo-convex shape formed on the pressing member PM.

Figure 9:
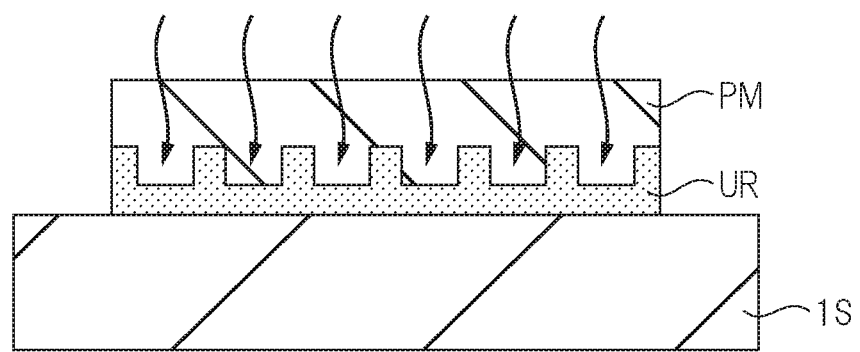
FIG. 9 is a diagram explaining the nano-imprint technology.

Subsequently, as shown in FIG. 9, in a state in which the pressing member PM is pressed against the substrate 1S, the ultraviolet curable resin UR is irradiated with ultraviolet rays. As a result, the ultraviolet curable resin UR is cured. At this time, the wavelength of the ultraviolet ray is, for example, 365 nm, and the irradiation energy is about 10 mJ/cm$^2$ to 6000 mJ/cm$^2$ although the irradiation energy depends on the film thickness. As a light source for emitting ultraviolet rays, a high-pressure mercury lamp or an LED can be used.

Figure 10:
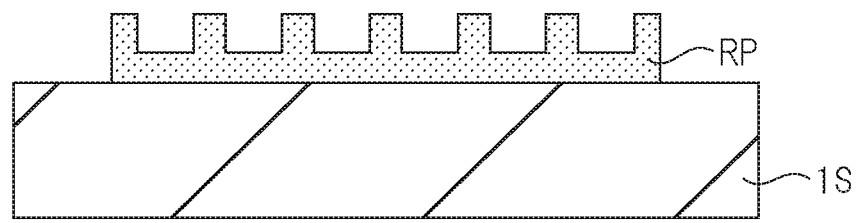
FIG. 10 is a diagram explaining the nano-imprint technology.

Thereafter, as shown in FIG. 10, when the pressing member PM is removed from the substrate is, a resin pattern RP in which the concave-convex shape formed on the pressing member PM is transferred is formed on the substrate 1S.

As described above, by using the nanoimprint technique, a resin pattern RP formed to have an uneven shape can be formed.

As described above, the nanoimprint technique based on the molding technique can cope with a wide range of processing dimensions and processing areas. Particularly, according to the nanoimprint technique, it is possible to cope with a line width of 15 nm, for example, and to form a further miniaturized pattern.

Next, a manufacturing process of a semiconductor device using the nanoimprint technique described above will be described with reference to the drawings.

First, as shown in FIGS. 11A and 11B, the semiconductor layer SL of the substrate SB (SOI substrate) composed of the supporting substrate SSB, the insulating layer CL, and the semiconductor layer SL is patterned by using the photolithography technique and the etching technique to form the optical waveguide WG1. Here, the insulating layer CL functions as a first clad layer. Thereafter, a protective film PRF made of, for example, a silicon oxide film is formed over the optical waveguide WG1 and the insulating layer CL by using a Chemical Vapor Deposition (CVD) method. Subsequently, an insulating film IF1 is formed on the protective film PRF, and an insulating film IF2 is formed on the insulating film IF1. The insulating films IF1 and IF2 are formed of, for example, a silicon oxide film. Thereafter, a protective film PF is formed on the insulating film IF2. The protective film PF made of, for example, a silicon nitride film. In this manner, a substrate SB having an insulating layer CL functioning as a first clad layer, an optical waveguide WG1 formed on the insulating layer CL, and a laminated film (insulating layer IF1+insulating layer IF2+protective film PF) functioning as a second clad layer formed on the insulating layer CL so as to cover the optical waveguide WG1 is prepared.

Subsequently, as shown in FIGS. 12A and 12B, an opening OP1 penetrating the protective film PF, the insulating film IF2, and the insulating film IF1 is formed by using a photolithography technique and an etching technique. At this time, one end portion of the optical waveguide WG1 is included in the opening OP1. In etching for forming the opening OP1, the protective film. PRF functions as an etching stopper, thereby protecting the optical waveguide WG1 from etching damage. Here, since both the insulating film IF1 and the protective film PRF are made of, for example, a silicon oxide film, it is questionable whether the protective film PRF functions as an etching stopper at the time of etching for forming the opening OP1. In this regard, for example, since the insulating film IF1 and the protective film PRF are formed by a CVD method using different source gases, the insulating film IF1 and the protective film PRF have different film densities. As a result, since the etching rate differs, the protective film PRF functions as an etching stopper when etching the insulating film IF1, and the optical waveguide WG1 covered with the protective film PRF is protected from etching damage.

Figure 14A:
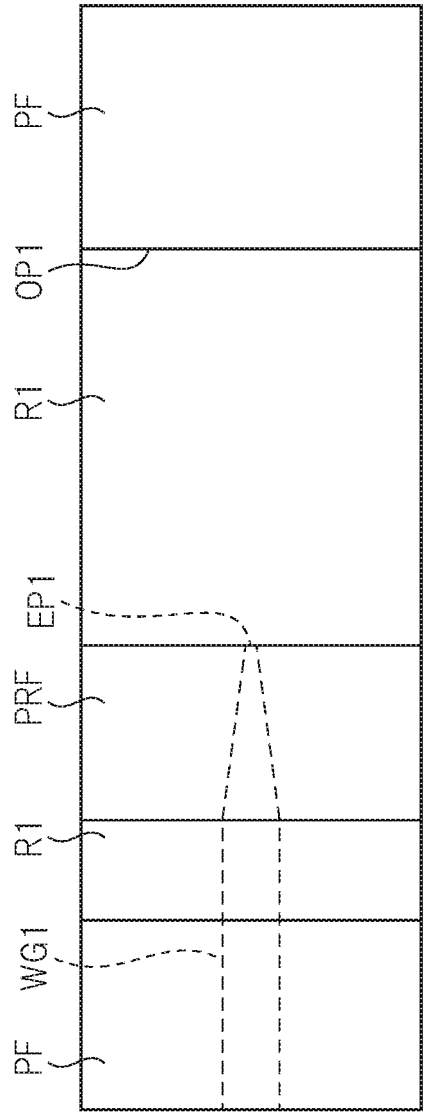
FIG. 14A is a cross-sectional view illustrating a manufacturing step of the semiconductor device following FIG. 13A.
Figure 14B:
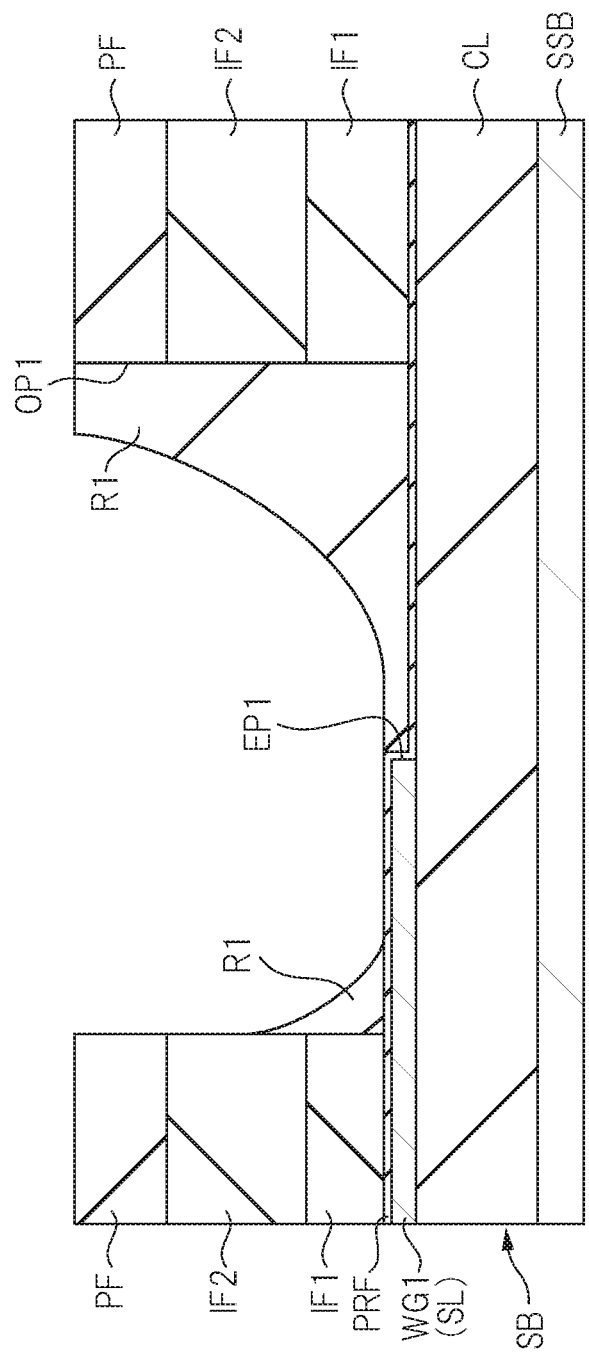
FIG. 14B is a cross-sectional view illustrating a manufacturing step of the semiconductor device following FIG. 13B.

Next, as shown in FIGS. 13A and 13B, a resin R1 made of an ultraviolet curable resin in an amount necessary and sufficient for using the nanoimprint technique is dropped (supplied) into the opening OP1 by a potting method. Then, as shown in FIG. 14A and FIG. 14B, the resin R1 supplied in the opening OP1 is molded into the shape shown in FIG. 14B by using the nanoimprint technique. Thereafter, after the excess resin R1 is removed, the resin R1 is cured by irradiating the molded resin R1 with ultraviolet rays. More specifically, in the nanoimprint technique, the resin R1 is pressed by the first pressing member, and the resin R1 is molded so as to be thicker as getting away from one end portion of the optical waveguide WG1. In other words, in the nanoimprint technique, the resin R1 is molded such that the surface of the resin R1 is recessed toward the insulating layer CL side. Further, as shown in FIG. 14B, when the protective film PRF is formed so as to cover the upper surface of the optical waveguide WG1, the resin R1 is pressed so that the protective film PRF covering the upper surface of the one end portion of the optical waveguide WG1 is exposed from the resin R1. However, as described later, when the protective film PRF covering the upper surface of the optical waveguide WG1 is not formed, the resin R1 is pressed so that the upper surface of the one end portion of the optical waveguide WG1 is exposed from the resin R1. Thereafter, the resin R1 is irradiated with ultraviolet rays in a state in which the resin R1 is pressed by the first pressing member, thereby curing the resin R1 to form a third clad layer.

Figure 15A:
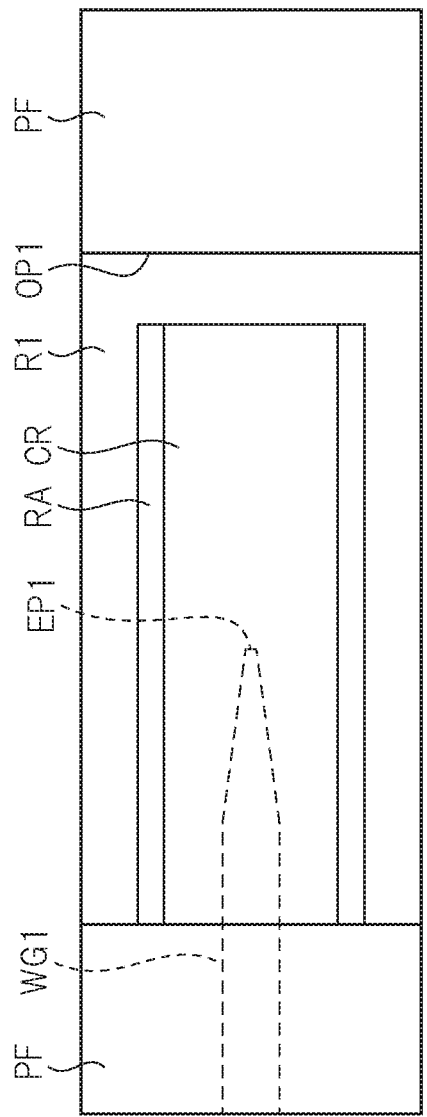
FIG. 15A is a cross-sectional view illustrating a manufacturing step of the semiconductor device following FIG. 14A.
Figure 15B:
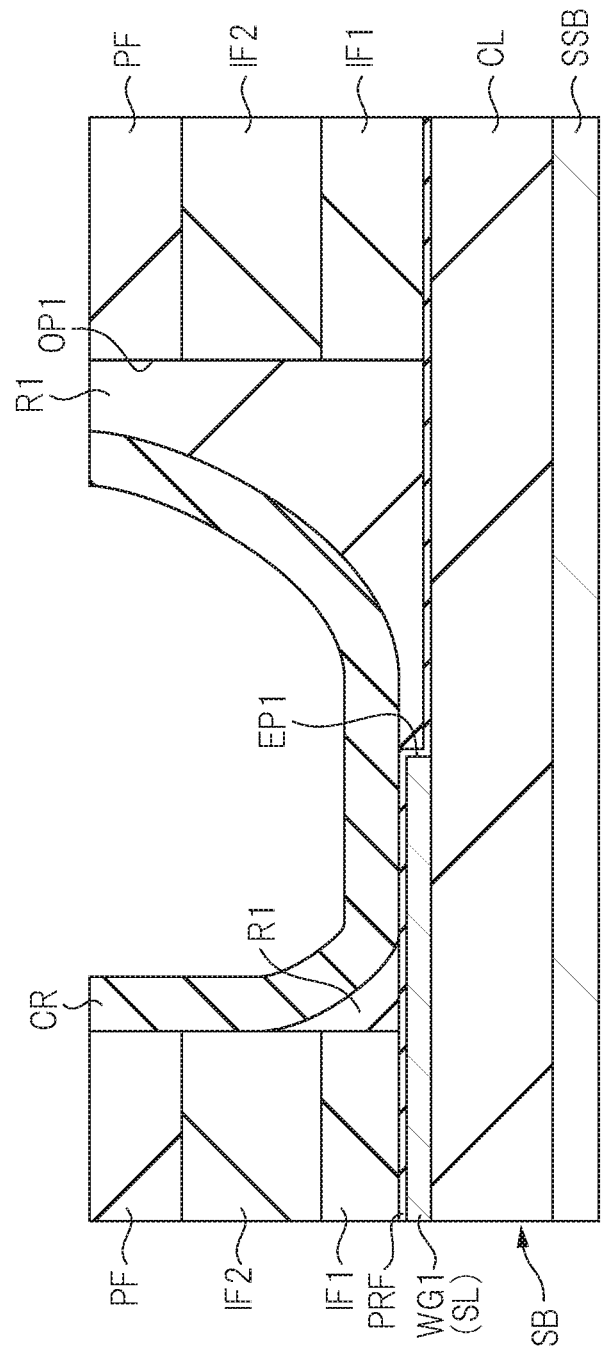
FIG. 15B is a cross-sectional view illustrating a manufacturing step of the semiconductor device following FIG. 14B.

Subsequently, as shown in FIGS. 15A and 15B, a resin CR composed of an ultraviolet curable resin is supplied onto the resin R1 functioning as the third clad layer. Here, the refractive index of the resin CR is greater than the refractive index of the fat R1.

Next, the resin CR is pressed by a second pressing member to adjust the thickness of the resin CR formed along the surface of the resin R1. At this time, as shown in FIG. 15A, by devising the structure of the second pressing member, the extra resin CR is configured to be dispersed in the resin sump RA, thereby preventing the occurrence of defects such as voids in the resin CR.

Figure 16A:
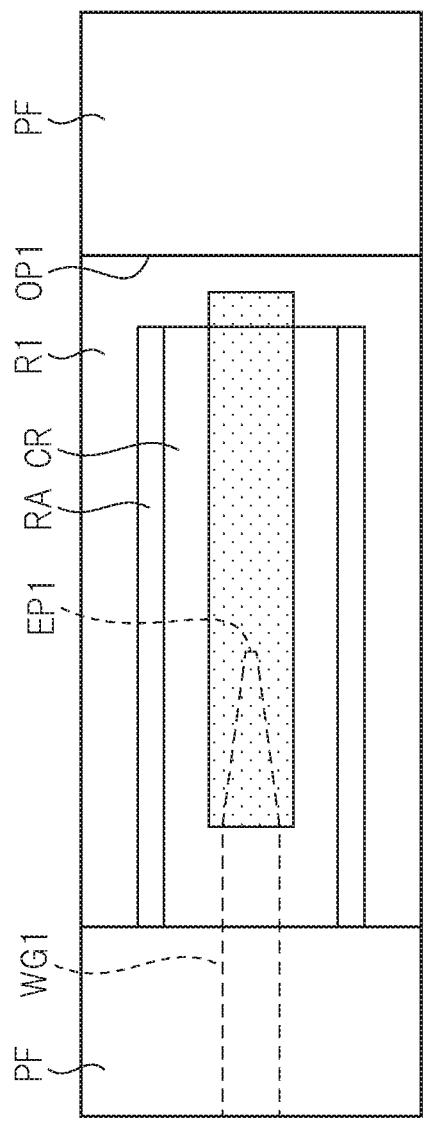
FIG. 16A is a cross-sectional view illustrating a manufacturing step of the semiconductor device following FIG. 15A.
Figure 16B:
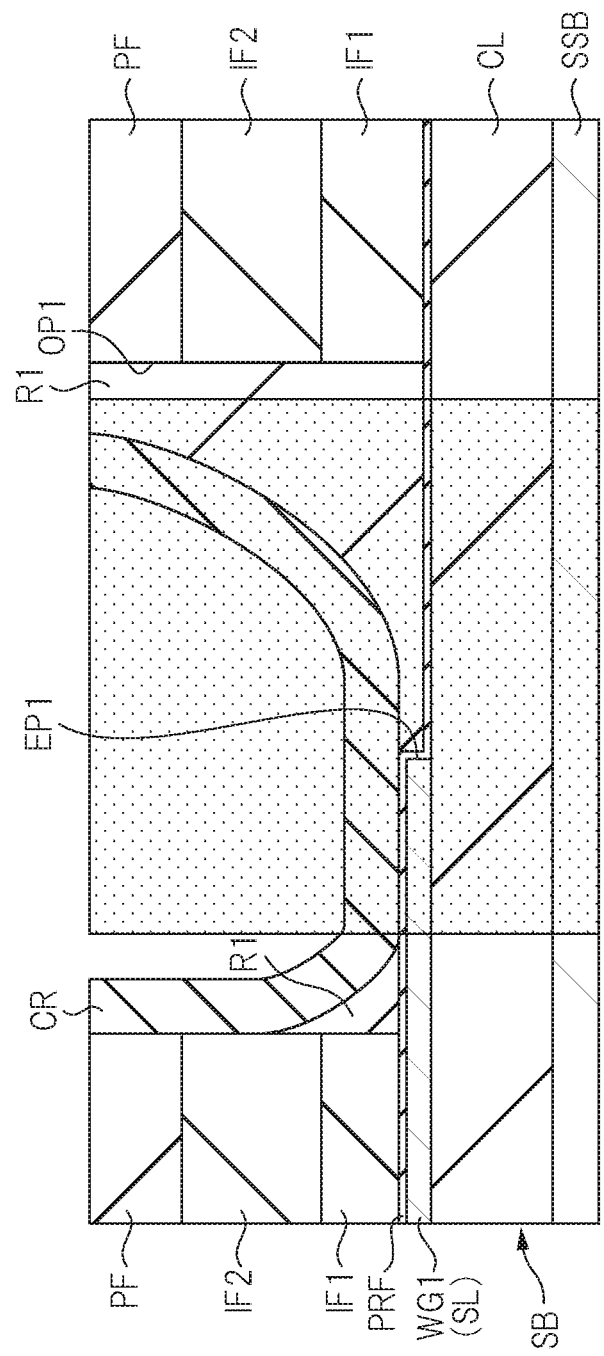
FIG. 16B is a cross-sectional view illustrating a manufacturing step of the semiconductor device following FIG. 15B.

Thereafter, as shown in FIG. 16A and FIG. 16B, in a state in which the resin CR is pressed by the second pressing member, a part of the resin CR is irradiated with ultraviolet rays (the dotted part in FIG. 16A and FIG. 16B). As a result, a part of the resin CR irradiated with ultraviolet rays is cured. Then, as shown in FIGS. 17A and 17B, the resin CR is patterned by performing development processing on the resin CR in which a part irradiated with ultraviolet rays is cured. Thus, the optical waveguide WG2 shown in FIGS. 17A and 17B can be formed.

Next, as shown in FIGS. 18A and 18B, after a resin R2 made of an ultraviolet curable resin is supplied in the opening OP1, the resin R2 is pressed by a third pressing member to expose the end surface EP2 of the optical waveguide WG2 from the upper surface of the resin R2. Then, in a state where the resin R2 is pressed by the third pressing member, the resin R2 is irradiated with ultraviolet rays to cure the resin R2, thereby forming a fourth clad layer.

In FIGS. 18A and 18B, in order to reduce the surface roughness (roughness) of the upper surface of the resin R1 and the upper surface of the resin R2, the upper surface of the resin R1 and the upper surface of the resin R2 may be subjected to a slight wet etching treatment.

As described above, by using the nanoimprint technique, an input/output element (semiconductor device) including the optical waveguide WG2 having a curved shape can be manufactured.

Although an example in which the resin R1, the resin CR, and the resin R2 are formed of an ultraviolet curable resin has been described in the manufacturing process of the semiconductor device (input/output element) according to the first embodiment, the technical idea according to the first embodiment is not limited to this, and for example, the resin R1, the resin CR, and the resin R2 may be formed of a thermosetting resin. For example, an ultraviolet curable resin or a thermosetting resin is formed by lending a refractive index adjusting material, a polymer, a monomer, a curing starting material, an auxiliary material, and the like, and the refractive index can be adjusted to about 1.35 to 1.8 with respect to light having a wavelength of 500 nm. Therefore, in these ultraviolet curable resins and thermosetting resins, a resin whose refractive index is adjusted to be small can be used for the resin R1 and the resin R2 serving as the clad layer, and a resin whose refractive index is adjusted to be large can be used for the resin CR serving as the core layer. Further, the above mentioned ultraviolet curable resin or thermosetting resin can be adjusted to a further large refractive index (about 2.0) in order to adjust the refractive index difference between the core layer and the clad layer.

Next, the characteristic points of the manufacturing method according to the first embodiment will be described. The characteristics of the manufacturing method according to present embodiment are that the manufacturing method of the input elements including the flat optical wayside WG1 and the three-dimensional optical wave pathway WG2, while the optical waveguide WG1 is formed by the Patterning Technique, the optical waveguide WG2 including the curve part CV is formed by the nano-printing technique. As a result, the optical waveguide WG2 including the three-dimensionally curved portion CV can be stably manufactured, and the manufacturing cost can be reduced. This is because the nanoimprint method has advantages of (1) high resolution, (2) excellent dimensional controllability, and (3) low cost. Particularly, the three-dimensionally curved portion CV of the optical waveguide WG2 can be easily formed by pressing the original plate having the curved shape against the substrate in the nanoimprint technique.

Here, for example, there is a technique of curving the end portion of a silicon thin-wire optical waveguide in a specific direction by ion implantation from a specific direction into a planar silicon thin-wire optical waveguide. However, in this technique, since the curved shape depends on the ion implantation amount (dose) and the implantation energy, it is extremely difficult to form the curved portion of the silicon thin-wire optical waveguide so that the tip portion of the curved portion formed in the silicon thin-wire waveguide coincides with the light receiving surface (design position) of the external optical fiber. That is, in this technique, in order to obtain a desired curved shape, it is necessary to adjust the ion implantation dose and the implantation energy with extremely high accuracy. In other words, this technique requires high alignment accuracy between the optical fiber and the semiconductor device in order to reduce the connection loss between the three-dimensional silicon thin-wire optical waveguide and the optical fiber. In other words, there is a very high technical difficulty (hurdle) that must be overcome in order to optically connect an optical fiber and a semiconductor device (input/output element) with low loss by a technique of forming a silicon thin-wire optical waveguide having a three-dimensional curved shape using ion implantation.

On the other hand, in the manufacturing method of the semiconductor device (input/output element) according to the first embodiment, the planar optical waveguide WG1 (silicon waveguide) itself is not curved. That is, in the manufacturing method of the semiconductor device (input/output element) according to the first embodiment, for example, the optical waveguide WG2 optically connected to the optical waveguide WG1 is formed using an ultraviolet curable resin suitable for application of the nanoimprint technique, and an original plate having a curved shape is used. As a result, according to the semiconductor device (input/output element) of the first embodiment, the optical waveguide WG2 having a curved shape can be manufactured stably and at low manufacturing cost. That is, the configuration of the input/output element according to the first embodiment including the planar optical waveguide WG1 and the optical waveguide WG2 having a three-dimensional curved shape is excellent in that it can be easily manufactured by employing a nanoimprint technique in which the technical difficulty of adjusting the radius of curvature of the curved shape is smaller than that of the ion implantation technique when the three-dimensional curved shape is formed.

Figure 19:
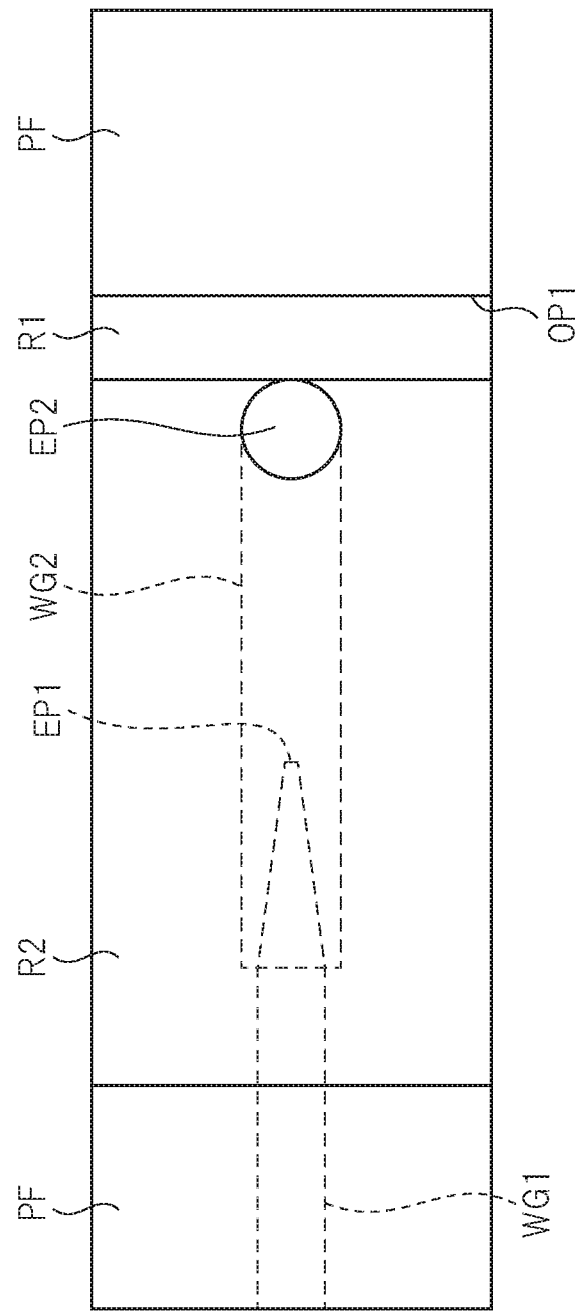
FIG. 19 is a plan view illustrating a schematic configuration of an input/output element according to a first modification.

FIG. 19 is a plan view showing a schematic configuration of an input/output element according to the first modification. As shown in FIG. 19, the end portion of the optical waveguide WG2 is exposed from the upper surface of the third clad layer made of the resin R1 and the resin R2. As shown in FIG. 19, the shape of the exposed end portion of the optical waveguide WG2 may be a circular shape. That is, for example, in the input/output element according to the first embodiment shown in FIG. 4, the shape of the exposed end portion of the optical waveguide WG2 is a rectangular shape, but the shape is not limited to this, and may be a circular shape as shown in FIG. 19.

Here, as shown in FIG. 19, when the shape of the exposed end portion of the optical waveguide WG2 is a circular shape, it is possible to obtain an advantage that the ease of connection with an optical fiber having a circular shape disposed outside the input/output element can be improved.

Figure 20:
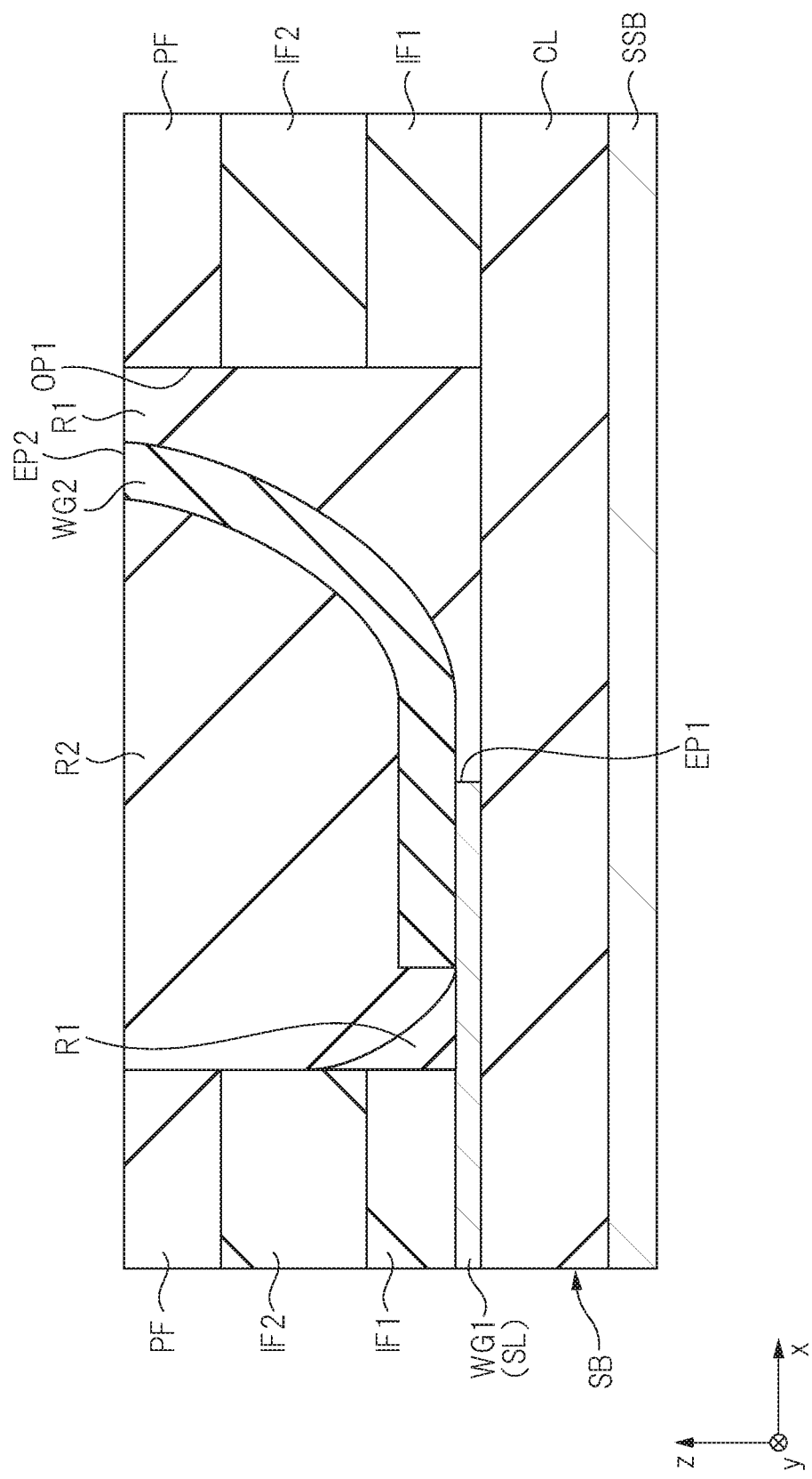
FIG. 20 is a cross-sectional view illustrating the schematic configuration of the input/output element according to a second modification.

FIG. 20 is a cross-sectional view showing a schematic configuration of an input/output element according to the second modification. For example, the input-output elements in FIG. 5 in the first embodiment have a protective film. PRF that covers the optical wave pathway WG1. In addition, as shown in FIG. 20, it is not necessary to form a protective film PRF that covers the optical waveguide WG1.

In the configuration in which the protective film PRF covering the optical waveguide WG1 is formed, the optical waveguide WG1 can be protected from the etching used in forming the opening OP1. As a result, it is possible to suppress an increase in the surface roughness of the optical waveguide WG1 caused by etching damage. In this case, unnecessary light scattering of the light propagating through the optical waveguide WG1 can be suppressed, so that the waveguide characteristics of the optical waveguide WG1 can be improved.

On the other hand, in the configuration in which the protective film. PRF covering the optical waveguide WG1 is not formed, the optical waveguide WG1 and the optical waveguide WG2 can be brought into direct contact with each other, so that the coupling loss between the optical waveguide WG1 and the optical waveguide WG2 can be reduced.

Figures 21A, 21B:
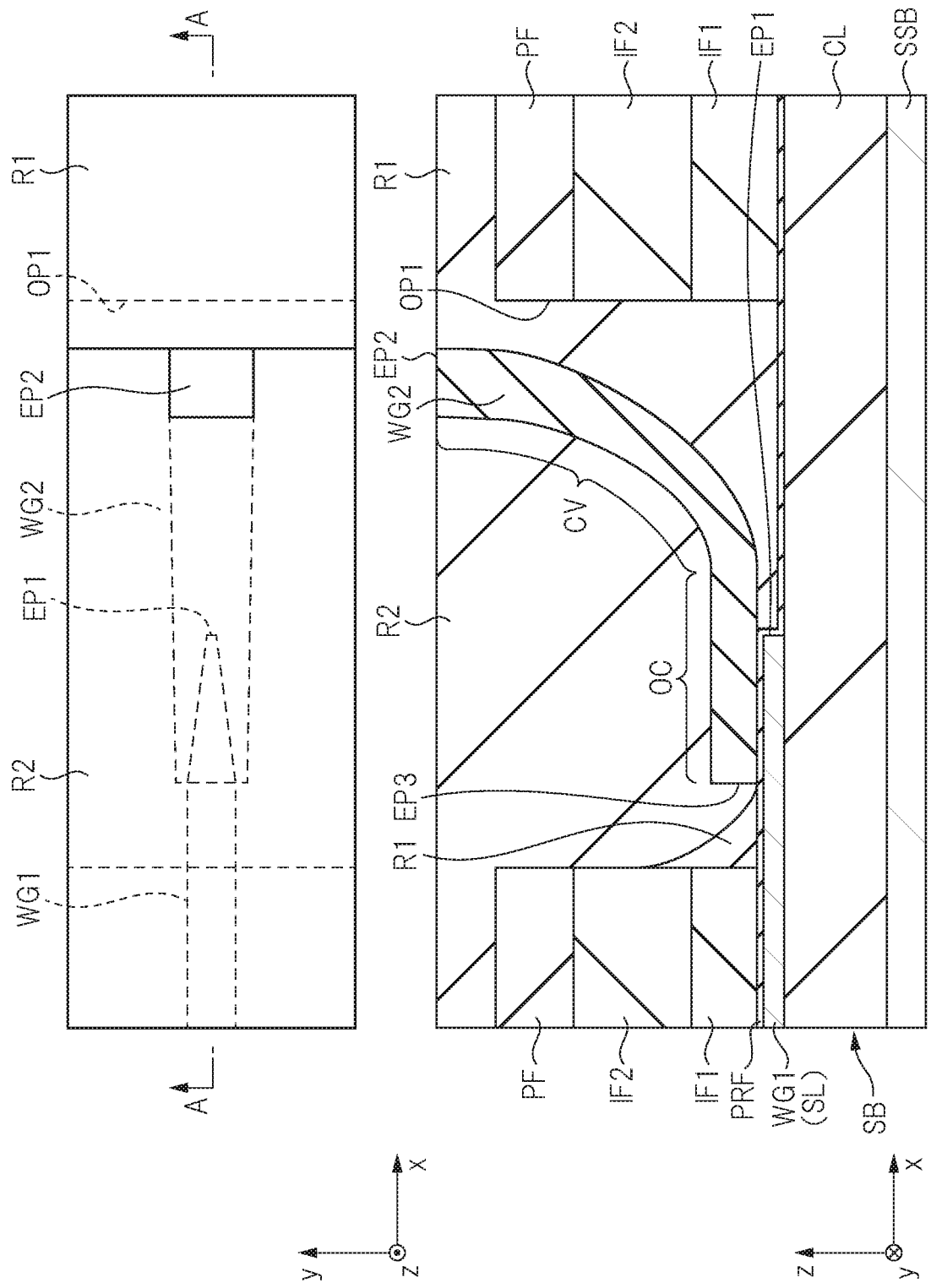
FIG. 21A is a plan view illustrating the schematic configuration of the input/output element according to the second embodiment.
FIG. 21B is a cross-sectional view taken along A-A line in FIG. 21A.

FIG. 21A is a plan view showing a schematic configuration of an input/output element in the second embodiment, and FIG. 21B is a cross-sectional view taken along line A-A of FIG. 21A.

As shown in FIG. 21A and FIG. 21B, the two characteristics according to present embodiment are that the cross-sectional size of the curved portion CV (the area of the end EP2) located in the upper surface of the third clad layer (resin R1 and resin R2) is greater than the cross-sectional size in the optical coupling portion OC. Concretely, the two characteristics of this embodiment are that the cross-sectional size of the curved portion CV in the cross-section that is perpendicular to the extension direction of the optical waveguide WG2 is greater as the cross-section becomes closer to the upper surface of the third clad layer (resin R1 and resin R2).

As a result, while ensuring optical coupling between the optical waveguide WG1 and the optical waveguide WG2 (optical coupling portion OC), the area of the end surface EP2 of the optical waveguide WG2 (the output cross-sectional area (the end portion) of the input/output element) can be made close to the size of the external optical waveguide (the cross-sectional area (the end area) of the optical fiber). As a result, according to the input-output element in the second embodiment, it is possible to reduce the liability loss between the optical waveguide WG2 and the external optical fiber while reducing the light loss between the optical wave waveguide WG1 and the optical waveguide WG2. Particularly, in the second embodiment, by gradually changing the cross-sectional area of the optical waveguide WG2, the area of the end surface EP2 of the optical waveguide WG2 can be adjusted so as to reduce the loss of connection with the optical fiber connected to the outside of the input/output element, while suppressing a sudden change in the cross-sectional area that causes the deterioration of the optical property. And, for example, as shown in FIG. 21B, the thickness of the z-direction thickness of the third clad layer, consisting of resin R1 and resin R2, is greater than the thickness of the z-direction of the second-class layer, which consists of the dismarginal IF1 and the protective film, PF, and so on. As a result, the area of the end surface EP2 of the optical waveguide WG2 can be adjusted so as to reduce the connection loss with the optical fiber connected to the outside of the input/output element while the radius of curvature of the curved portion CV of the optical waveguide WG2 is gradual. That is, in realizing the characteristic point in the second embodiment, by further adopting a device for adjusting the thickness in the z direction of the third clad layer composed of the resin R1 and the resin R2, it is possible to avoid narrowing of the radius of curvature of the curved portion CV in which the optical loss becomes large.

For example, in FIG. 21B, in the cross section perpendicular to the extending direction of the optical waveguide WG2, the widths in the y direction at the end portion EP3 of the optical coupling portion OC of the optical waveguide WG2 are 1 µm or more and 3 µm or less, and the cross-sectional area (end area) at the end portion EP3 of the optical coupling portion OC is 1 µm$^2$ or more and 10 µm$^2$ or less. On the other hand, the widths in the y-direction of the optical waveguides WG2 on the upper surfaces (end surfaces EP2) of the third clad layers (resin R1 and resin P2) are 5 µm or more and 9 µm or less, and the cross-sectional areas (end areas) of the end surfaces EP2 of the curved portions CV are 20 µm$^2$ or more and 100 µm$^2$ or less, respectively.

In the manufacturing process of input/output element according to present embodiment, for example, in the manufacturing process of the input/output elements according to the first embodiment shown in FIG. 15, the thickness of the resin CR located at the bottom of the opening OP1 will be changed to adjust the thickness of the resin R2 so that it becomes smaller than the thickness of the resin CR located at the top of the opening OP1. In the manufacturing process of the input/output element according to the second embodiment, for example, the resin CR is changed to be patterned so that the cross-sectional area of the resin CR in the cross-section perpendicular to the extending direction of the resin CR increases from one end portion (see the end portion EP3 in FIG. 21B) of the resin CR toward the other end portion (see the end surface EP2 in FIG. 21B) of the resin CR with respect to FIGS. 16 to 17. In this manner, the input/output element (semiconductor device) according to the second embodiment can be manufactured.

Figure 22:
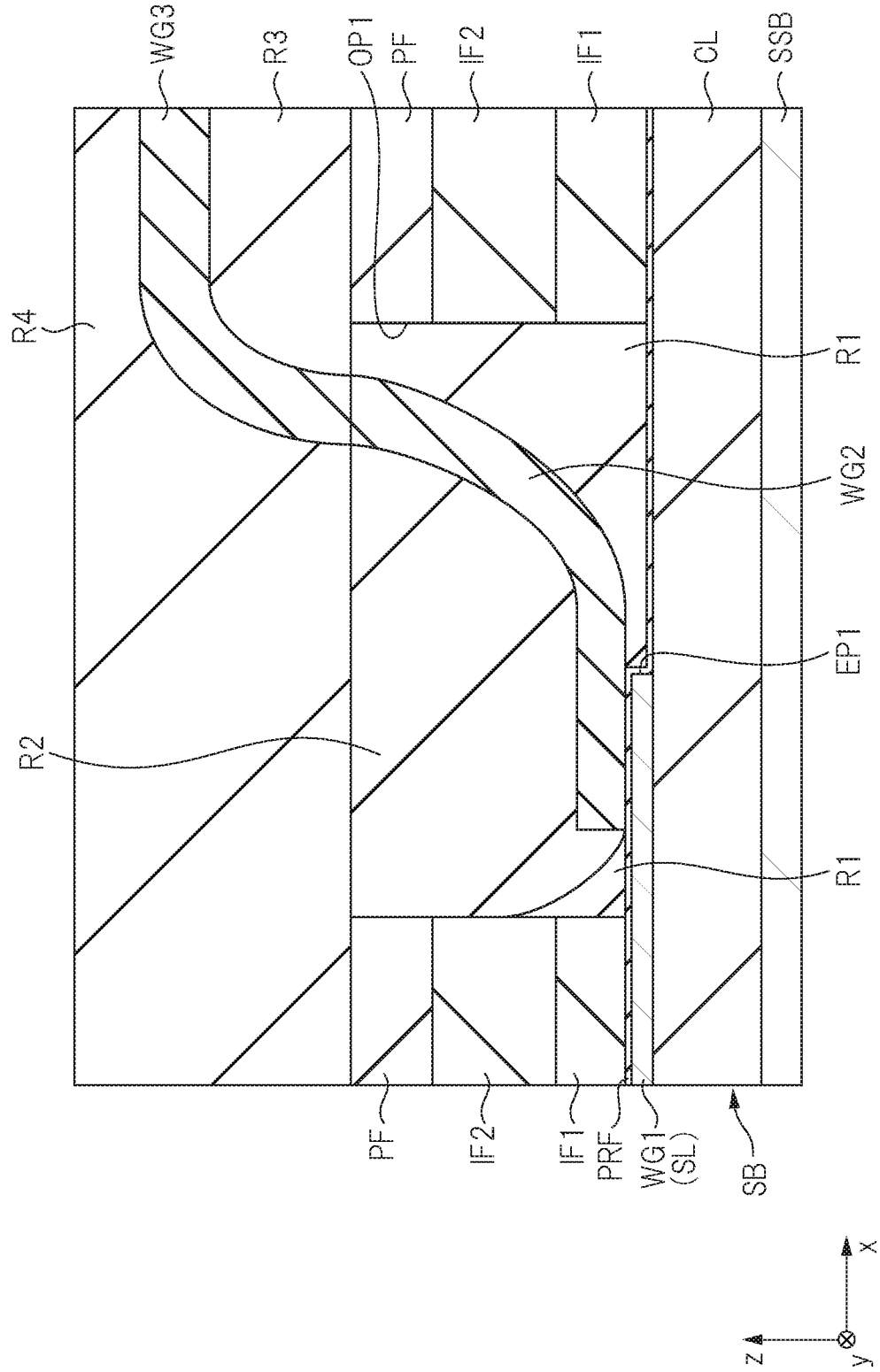
FIG. 22 is a cross-sectional view illustrating the schematic configuration of the input/output element in a third embodiment.

FIG. 22 is a cross-sectional view illustrating a schematic configuration of the input/output element according to the third embodiment.

As shown in FIG. 22, the input/output element according to the third embodiment has a fourth clad layer (resin R3) formed on the second clad layer (a laminated film of the insulating film IF1, the insulating film IF2, and the protective film PF) and on the third clad layer (resin R1 resin R2), on the premise of the structure shown in FIG. 5. The input/output element in the third embodiment includes an optical waveguide WG3 optically connected with the optical waveguide WG2 and formed on the fourth clad layer (resin R3), and a fifth clad layer (resin R4) covering the optical waveguide WG3 and formed on the second clad layer, the third clad layer, and the fourth clad layer. At this time, the optical waveguide WG3 is formed to reach the side surfaces of the fourth clad layer (resin R3) and the fifth clad layer (resin R4).

Here, the characteristics of the three embodiments are that, as shown in FIG. 22, an optical waveguide WG2 and an optical waveguide WG3 are installed, and optical waveguide WG3 is exposed from a side surface of resin R3 (a fourth clad layer) covering the optical waveguide WG3 (the fourth clad layer) and resin R4 (fifth clad layer) covering the optical waveguide WG3. That is, the characteristic point according to the third embodiment is that the output of the input/output element is taken out from the side surface of the layer having the height different from that of the optical waveguide WG1 by providing the optical waveguide WG2 having the curved shape and the optical waveguide WG3 having the curved shape. Thus, for example, by employing the three-dimensionally curved optical waveguide WG2 as shown in FIG. 5, not only is it possible to input and output light vertically, but by providing the optical waveguide WG3 having a further curved shape so as to be connected with the three-dimensionally curved optical waveguide WG2 as shown in FIG. 22, the input/output position of light from the input/output element can be changed to the side surfaces of the resin R3 and the resin R4. In this way, according to the third embodiment, the optical wave road WG3 with a curved shape can improve the flexibility to change the cross-section shape and size of input angle, input surface height and position, and optical waveguide WG3. This makes it easier to change the connection position with the externally arranged optical fiber to an appropriate position even if the input/output element is arranged at a higher density than, for example, an input/output element using a grating coupler in which the output position is uniquely fixed, thereby obtaining an advantage of facilitating the design of an optical circuit.

In the semiconductor device (article) in the above-described third embodiment, the resin R1 and the resin R2 are treated as the third clad layer together. The resin R3 is treated as the fourth clad layer, and the resin R4 is treated as the fifth clad layer.

On the other hand, as a manufacturing method of the semiconductor device according to the third embodiment described later, the resin R1 is handled as the third clad layer and the resin R2 is handled as the fourth clad layer by using the resin R1 and the resin R2 as separate components. The resin R3 is treated as the fifth clad layer, and the resin is treated as a sixth clad layer.

The manufacturing method of input/output element according to the third embodiment uses nano-imprint technology to form resin R3 (the fifth clad layer) and optical waveguide WG3 and resin R4 (the sixth clad layer). Specifically, in the manufacturing method of the input/output element according to the third embodiment, a fourth curable resin (resin R3) is supplied on the second clad layer (a laminated film composed of the insulating film IF1, the insulating film IF2, and the protective film PF), on the third clad layer (resin R1), and on the fourth clad layer (resin R2) Then, in the manufacturing method of the input/output element according to the third embodiment, after pressing the resin R3 with the fourth press member and molding the resin R3 to expose the optical waveguide WG2, the resin R3 is cured by the fourth press member and the resin R3 is cured by heat or light to form the fifth clad layer (resin R3). Thereafter, in the manufacturing method of the input/output element according to the third embodiment, a fifth curable resin is supplied onto the fifth clad layer. Subsequently, in the manufacturing method of input/output element according to the third embodiment, the fifth curable resin is pressed with the fifth pressing member, and after adjusting the thickness of the above-mentioned fifth curable resin which is formed along the surface of the fifth clad layer, the fifth curable resin is pressed with the fifth pressing member, and the fifth curable resin is hardened by heat or light. Then, in the manufacturing method of the input/output element according to the third embodiment, the optical waveguide WG3 is formed by patterning the cured fifth curable resin. Thereafter, in the manufacturing method of the input element according to the third embodiment, after the resin P4 is supplied so as to cover the optical waveguide WG3, the resin R4 is molded. In the manufacturing method of the input/output element according to the third embodiment, the resin R4 is cured by heat or light to form a sixth clad layer (resin R4). As described above, the input/output element according to the third embodiment can be manufactured.

Fourth Embodiment

Figure 23:
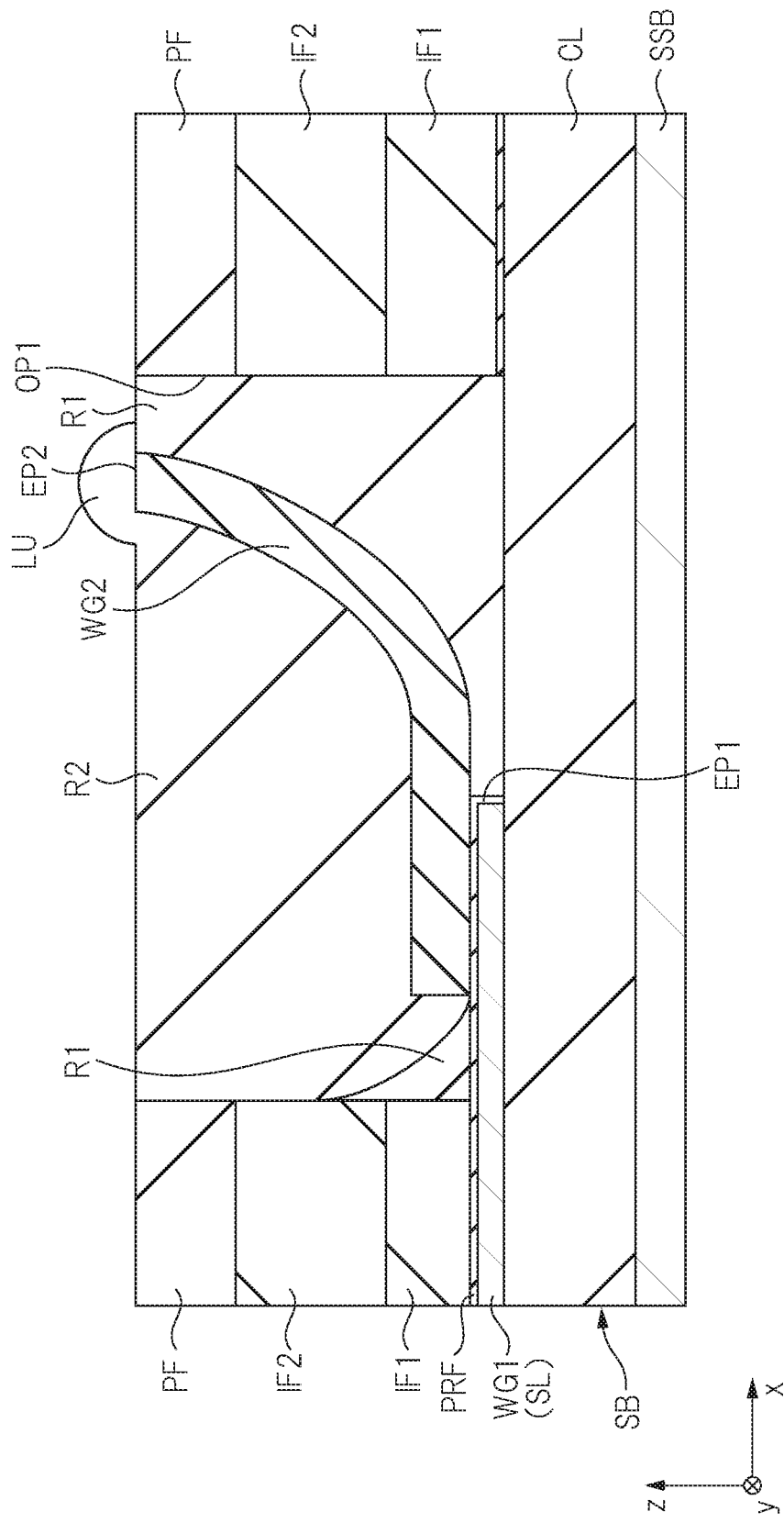
FIG. 23 is a cross-sectional view illustrating the schematic configuration of the input/output element in a fourth embodiment.

FIG. 23 is a cross-sectional view illustrating a schematic configuration of the input/output element according to the fourth embodiment. In FIG. 23, the fourth embodiment is characterized in that the lens portion LU is optically connected with the optical waveguide WG2 and formed on the upper surface of the third clad layer (resin R1 and resin R2). As a result, according to the fourth embodiment, the connection loss between the optical waveguide WG2 and the external optical fiber can be reduced by the lens portion LU provided in the output portion of the optical waveguide WG2, i.e., the end surface EP2. As a result, the performance of the input element in the fourth embodiment can be improved.

Particularly, according to the feature of the fourth embodiment, since the light collection efficiency can be improved by the lens portion LU, the coupling efficiency with an optical fiber or the like can be improved. In addition, when the emission surface from the optical waveguide WG2 is a plane surface, reflection of light occurs on the emission surface, but reflection of light can be reduced in the lens portion LU. In addition, when the emitted light is condensed, the alignment margin with the optical fiber is increased. Further, even when the optical circuits are arranged at high density, it is possible to obtain an advantage that it is easy to perform an optical wafer test.

The lens portion LU may be made of the same material as the resin R1 or the resin R2, or may be made of the same material as the resin constituting the optical waveguide WG2. Particularly, from the viewpoint of ease of manufacturing the lens LU, it is desirable to use the same material as the resin R1 or the resin R2. On the other hand, from the viewpoint of reducing the optical loss, it is desirable to use the same material as the resin constituting the optical waveguide WG2.

In the manufacturing method of the input/output element according to the fourth embodiment configured as described above, for example, as shown in FIG. 23, a sixth curable resin is supplied in the opening OP1, the other end portion (end surface EP2) of the optical waveguide WG2, and the resin R1 (third clad layer). Then, in the manufacturing method of the input/output element according to the fourth embodiment, the sixth curable resin is pressed by a sixth pressing member to mold the sixth curable resin positioned on the other end portion of the optical waveguide WG2 into a lens shape, and then the sixth curable resin is cured by heat or light in a state in which the sixth curable resin is pressed by the sixth pressing member. Thus, according to the fourth embodiment, the resin R2 made of the sixth curable resin and the lens portion LU can be integrally formed.

The invention made by the present inventor has been described above in detail based on the embodiments, but the present invention is not limited to the embodiments described above, and it is needless to say that various modifications can be made without departing from the gist thereof.

What is claimed is:

1. A semiconductor device comprising:
   a first clad layer;
   a first optical waveguide formed on the first clad layer;
   a second clad layer formed on the first optical waveguide and the first clad layer, the second clad layer having an opening overlapping an end portion of the first optical waveguide in plan view;
   a second optical waveguide optically connected with the first optical waveguide and formed in the opening; and
   a third clad layer burying the opening and configured to surround the second optical waveguide,
   wherein the third clad layer comprises:
      a first resin portion formed in the opening such that the second optical waveguide is formed on the first resin, the first resin portion being composed of a material including resin; and
      a second resin portion formed on the first resin portion such that the second resin portion covers the second optical waveguide, the second resin portion composed of a material including resin, and
   wherein the second optical waveguide is configured to reach an upper surface of the third clad layer from the end portion of the first optical waveguide.

2. The semiconductor device according to claim 1, wherein the second optical waveguide comprises:
   an optical coupling portion optically connected with the first optical waveguide; and
   a curved portion connected with the optical coupling portion and having a curved shape.

3. The semiconductor device according to claim 2, wherein the optical coupling portion of the second optical waveguide and the end portion of the first optical waveguide have an overlapping portion with each other in plan view, and
   wherein the optical coupling portion is disposed along the end portion of the first optical waveguide to be parallel with the first optical waveguide.

4. The semiconductor device according to claim 2, wherein a cross-sectional area of the curved portion located in an upper surface side of the third clad layer is greater than a cross-sectional area of the curved portion located in an end portion side of the first optical waveguide, in a cross-sectional view perpendicular to an extending direction of the second optical waveguide.

5. The semiconductor device according to claim 2, wherein a cross-sectional area of the curved portion located in a cross-sectional view perpendicular to an extending direction of the second optical waveguide increases as closing to the upper surface of the third clad layer.

6. The semiconductor device according to claim 2, wherein a cross-sectional area of the second optical waveguide in an end portion of the optical coupling portion is 1 $\mu m^2$ or more and 10 $\mu m^2$ or less in a cross-sectional view perpendicular to an extending direction of the second optical waveguide, and
   wherein a cross-sectional area of the second optical waveguide in the upper surface of the third clad layer is 20 $\mu m^2$ or more and 100 $\mu m^2$ or less in the cross-sectional view perpendicular to the extending direction of the second optical waveguide.

7. The semiconductor device according to claim 1, wherein a width of the first optical waveguide in a direction perpendicular to an extending direction of the first optical waveguide decreases as closing to an end surface of the end portion of the first optical waveguide.

8. The semiconductor device according to claim 1, further comprising:
   a fourth clad layer formed on the second clad layer and the third clad layer;
   a third optical waveguide optically connected with the second optical waveguide and formed on the fourth clad layer; and
   a fifth clad layer covering the third optical waveguide and formed on the second, third and fourth clad layers,
   wherein the third optical waveguide is configured to reach a side surface of the fifth clad layer.

9. The semiconductor device according to claim 1, further comprising a lens portion optically connected with the second optical waveguide and formed on the upper surface of the third clad layer.

10. The semiconductor device according to claim 1, wherein the first optical waveguide is composed of material including silicon, and
wherein the second optical waveguide is composed of material including resin.

11. The semiconductor device according to claim 1, wherein a refractive index of the first optical waveguide is greater than a refractive index of the first clad layer and a refractive index of the second clad layer, and
wherein a refractive index of the second optical waveguide is greater than a refractive index of the third clad layer.

12. The semiconductor device according to claim 1, wherein a thickness of the third clad layer is greater than a thickness of the second clad layer.

13. The semiconductor device according to claim 1, wherein a recess portion is formed on the first resin portion,
wherein the recess portion is apart from the first optical waveguide, and
wherein a material including resin is buried in the recess portion.

14. The semiconductor device according to claim 1, comprising a protective film formed on the first optical waveguide and the first clad layer,
wherein the protective film is exposed in the opening.

15. A manufacturing method of a semiconductor device comprising:
(a) preparing a substrate comprising a first clad layer, a first optical waveguide formed on the first clad layer, and a second clad layer formed on the first clad layer such that the second clad layer covers the first optical waveguide;
(b) forming an opening in the second clad layer, the opening overlapping an end portion of the first optical waveguide in plan view;
(c) supplying a first curable resin in the opening;
(d) pressing the first curable resin with a first pressing member to mold the first curable resin so as to be thicker as getting away from the end portion of the first optical waveguide;
(e) hardening the first curable resin by heat or light while the first curable resin is pressed with the first pressing member to form a first resin portion of a third clad layer;
(f) supplying a second curable resin on the first resin portion of the third clad layer;
(g) pressing the second curable resin with a second pressing member to adjust a thickness of the second curable resin so as to along a surface of the first resin portion of the third clad layer;
(h) hardening the second curable resin by heat or light while the second curable resin is pressed with the second pressing member;
(i) patterning the second curable resin hardened to form a second optical waveguide,
(j) supplying the opening with a third curable resin on the second optical waveguide and the first resin portion of the third clad layer in;
(k) pressing the third curable resin with a third pressing member to expose an end portion of the second optical waveguide from an upper surface of the third curable resin; and (l) hardening the third curable resin by heat or light form a second resin portion of the third clad layer,
wherein the semiconductor device comprising:
the first clad layer;
the first optical waveguide formed on the first clad layer;
the second clad layer formed on the first optical waveguide and the first clad layer, the second clad layer having the opening overlapping the end portion of the first optical waveguide in plan view;
the second optical waveguide optically connected with the first optical waveguide and formed in the opening; and
the third clad layer burying the opening and configured to surround the second optical waveguide,
wherein the second optical waveguide is configured to reach an upper surface of the third clad layer from the end portion of the first optical waveguide, and
wherein the third clad layer comprises:
the first resin portion formed in the opening such that the second optical waveguide is formed on the first resin and composed of material including resin, and
the second resin portion formed on the first resin portion such that the second resin portion covers the second optical waveguide, the second resin portion composed of material including resin.

16. The manufacturing method of the semiconductor device according to claim 15, wherein the first curable resin is molded so as to recess a surface of the first curable resin toward a first clad layer side.

17. The manufacturing method of the semiconductor device according to claim 15, wherein the first curable resin is pressed so as to expose an upper surface of the end portion of the first optical waveguide in pressing the first curable resin.

18. The manufacturing method of the semiconductor device according to claim 15, wherein the thickness of the second curable resin is adjusted so as to be smaller than the thickness of the second curable resin located in an upper portion of the opening in pressing the second curable resin.

19. The manufacturing method of the semiconductor device according to claim 15, wherein the second optical waveguide is patterned such that a cross-sectional area of the second optical waveguide in a cross-sectional view perpendicular to an extending direction of the second optical waveguide increases as closing from one end portion of the second optical waveguide to the other end portion of the second optical waveguide in patterning the second curable resin hardened.

20. The manufacturing method of the semiconductor device according to claim 15, further comprising:
(m) supplying a fourth curable resin on the and third clad layers;
(n) pressing the fourth curable resin with a fourth pressing member to expose the second optical waveguide;
(o) hardening the fourth curable resin by heat or light while the fourth curable resin is pressed with the fourth pressing member to form a fourth clad layer;
(p) supplying a fifth curable resin on the fourth clad layer;
(q) pressing the fifth curable resin with a fifth pressing member to adjust a thickness of the fifth curable resin so as to along a surface of the fourth clad layer;
(r) hardening the fifth curable resin by heat or light while the fifth curable resin is pressed with the fifth pressing member; and
(s) patterning the fifth curable resin hardened to form a third optical waveguide.

21. The manufacturing method of the semiconductor device according to claim 15, further comprising:
- (t) supplying a sixth curable resin in the opening, on the other end portion of the second optical waveguide and on the third clad layer;
- (u) pressing the sixth curable resin with a sixth pressing member to mold the sixth curable resin located on the other end portion of the second optical waveguide into a lens shape; and
- (v) hardening the sixth curable resin by heat or light while the sixth curable resin is pressed with the sixth pressing member.

* * * * *